United States Patent
Yamashita et al.

(10) Patent No.: US 8,137,860 B2
(45) Date of Patent: *Mar. 20, 2012

(54) POLYMER ELECTROLYTE MEMBRANE FOR SOLID POLYMER FUEL CELL, MEMBRANE-ELECTRODE ASSEMBLY AND FUEL CELL

(75) Inventors: Takashi Yamashita, Tsukuba (JP); Shinji Nakai, Tsukuba (JP); Hiroyuki Ogi, Tsukuba (JP); Tomohiro Ono, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 1259 days.

This patent is subject to a terminal disclaimer.

(21) Appl. No.: 11/722,834

(22) PCT Filed: Dec. 27, 2005

(86) PCT No.: PCT/JP2005/024248
§ 371 (c)(1),
(2), (4) Date: Jun. 26, 2007

(87) PCT Pub. No.: WO2006/070929
PCT Pub. Date: Jul. 6, 2006

(65) Prior Publication Data
US 2009/0123804 A1    May 14, 2009

(30) Foreign Application Priority Data

Dec. 27, 2004 (JP) .................. 2004-377999
Jun. 29, 2005 (JP) .................. 2005-190149

(51) Int. Cl.
*H01M 8/10* (2006.01)
(52) U.S. Cl. .................................... 429/492
(58) Field of Classification Search .............. None
See application file for complete search history.

(56) References Cited

U.S. PATENT DOCUMENTS

| 5,679,482 | A | 10/1997 | Ehrenberg et al. |
| 6,413,298 | B1 | 7/2002 | Wnek et al. |
| 2003/0091886 | A1 | 5/2003 | Tanioka et al. |
| 2004/0005490 | A1 | 1/2004 | Fan et al. |

(Continued)

FOREIGN PATENT DOCUMENTS

EP    1 179 550 A1    2/2002
(Continued)

OTHER PUBLICATIONS

Extended Supplementary European Search Report issued Sep. 6, 2010 in European Application No. 05822644.

(Continued)

*Primary Examiner* — Barbara Gilliam
*Assistant Examiner* — Stephan Essex
(74) *Attorney, Agent, or Firm* — Oblon, Spivak, McClelland, Maier & Neustadt, L.L.P.

(57) ABSTRACT

This invention relates to a polymer electrolyte membrane for polymer electrolyte fuel cells, comprising a block copolymer which comprises, as its constituents, a polymer block (A) having as a main unit an aromatic vinyl compound unit whose α-carbon is quaternary carbon, and a flexible polymer block (B), and has ion-conducting groups on the polymer block (A). The electrolyte membrane of this invention is economical, mild to the environment and excellent in moldability and chemical stability and thus durability, and, therefore, can suitably be used in membrane electrode assemblies and polymer electrolyte fuel cells.

16 Claims, 3 Drawing Sheets

U.S. PATENT DOCUMENTS

2004/0038107 A1    2/2004    Fan et al.

FOREIGN PATENT DOCUMENTS

| | | |
|---|---|---|
| EP | 1 664 130 AO | 6/2006 |
| JP | 06-093114 | 4/1994 |
| JP | 2735693 | 1/1998 |
| JP | 10-503788 | 4/1998 |
| JP | 11-273695 | 10/1999 |
| JP | 2996752 | 10/1999 |
| JP | 2000-331693 | 11/2000 |
| JP | 2001-210336 | 8/2001 |
| JP | 2002367626 A * | 12/2002 |
| JP | 2004-247185 | 9/2004 |
| WO | WO 2004/045014 A2 | 5/2004 |
| WO | WO 2005/030812 A1 | 4/2005 |

OTHER PUBLICATIONS

U.S. Appl. No. 12/523,814, filed Jul. 20, 2009, Ohgi, et al.
U.S. Appl. No. 12/162,375, filed Jul. 28, 2008, Ono, et al.
U.S. Appl. No. 12/278,794, filed Aug. 8, 2008, Ono, et al.

* cited by examiner

POLYMER ELECTROLYTE MEMBRANE FOR SOLID POLYMER FUEL CELL, MEMBRANE-ELECTRODE ASSEMBLY AND FUEL CELL

TECHNICAL FIELD

This invention relates to a polymer electrolyte membrane for polymer electrolyte fuel cells, and a membrane electrode assembly and a polymer electrolyte fuel cell in both of which the polymer electrolyte membrane is used.

BACKGROUND ART

In recent years, as a radical solution of energetic and environmental problems, and further, as a central energy conversion system in the future age of hydrogen energy, fuel cell technique has been reckoned as one of the cores of new energy technique. Especially, polymer electrolyte fuel cells (PEFC) are tried to be applied as power sources for electric automobiles, power sources for portable apparatuses, and, further, applied to domestically stationary power source apparatuses utilizing electricity and heat at the same time, from the viewpoints of miniaturization and lightening, etc.

A polymer electrolyte fuel cell is generally composed as follows. First, on both sides of a polymer electrolyte membrane having cation conductivity (cation is usually proton), catalyst layers comprising a carbon powder-supported platinum group metal catalyst and a cation-conducting binder comprising a polymer electrolyte are formed, respectively. On the outsides of the catalyst layers, gas diffusion layers as porous materials through which fuel gas and oxidant gas can pass are formed, respectively. As the gas diffusion layers, carbon paper, carbon cloth, etc. are used. An integrated combination of the catalyst layer and the gas diffusion layer is called a gas diffusion electrode, and a structure wherein a pair of gas diffusion electrodes are stuck to the electrolyte membrane so that the catalyst layers can face to the electrolyte membrane, respectively is called a membrane electrode assembly (MEA). On both sides of the membrane electrode assembly, separators having electric conductivity and gastightness are placed. Gas passages supplying the fuel gas or oxidant gas (e.g., air) onto the electrode surfaces are formed, respectively, at the contact parts of the membrane electrode assembly and the separators or inside the separators. Power generation is started by supplying a fuel gas such as hydrogen or methanol to one electrode (fuel electrode) and an oxidant gas containing oxygen such as air to the other electrode (oxygen electrode). Namely, the fuel gas is ionized at the fuel electrode to form protons and electrons, the protons pass through the electrolyte membrane and transferred to the oxygen electrode, the electrons are transferred via an external circuit formed by connecting both electrodes into the oxygen electrode, and they react with the oxidant gas to form water. Thus, the chemical energy of the fuel gas is directly converted into electric energy which can be taken out.

Further, in addition to such cation exchange-type fuel cells, anion exchange-type fuel cells using an anion-conducting membrane and an anion-conducting binder (the anions are usually hydroxide ions) are also studied. It is known that in anion exchange-type fuel cells, overvoltage at the oxygen electrode is reduced, and the improvement of energy efficiency is expected. Further, it is said that, when methanol is used as the fuel, methanol crossover wherein methanol passes through the electrolyte membrane between the electrodes is reduced. The constitution of a polymer electrolyte fuel cell in this case is basically the same as in the cation exchange-type fuel cell except that an anion-conducting membrane and an anion-conducting binder are used in place of the cation-conducting membrane and the cation-conducting binder, respectively. As to the mechanism of generation of electric energy, oxygen, water and electrons react at the oxygen electrode to form hydroxide ions, the hydroxide ions pass through the anion-conducting membrane and react with hydrogen at the fuel electrode to form water and electrons, and the electrons are transferred via an external circuit formed by connecting both electrodes into the oxygen electrode and react again with oxygen and water to form hydroxide ions. Thus, the chemical energy of the fuel gas is directly converted into electric energy which can be taken out.

As a polymer electrolyte membrane used in cation exchange-type fuel cells, Nafion (registered trade mark of Dupont Co., as is the same hereinafter) which is a perfluorocarbonsulfonic acid-type polymer is generally used. However, Nafion is a fluoropolymer and very expensive. Further, Nafion has a problem that when methanol is used as the fuel, a phenomenon that methanol passes through the electrolyte membrane from one electrode side to the other electrode side (methanol crossover) occurs easily. Further, fluorine-containing polymers contain fluorine and consideration to the environment is necessary at the time of synthesis and disposal.

From such a background as mentioned above, development of cation-conducting polymer electrolyte membranes using a non-fluoropolymer as a base polymer has been tried. For example, there is an example that a polystyrenesulfonic acid-type polymer electrolyte membrane was used in a polymer electrolyte fuel cell developed by General Electric Co. in U.S.A. in the 1950s, but, ones which have been studied heretofore did not exhibit sufficient stability under the environment of operation of fuel cells, and sufficient cell life could not be obtained.

Further, an electrolyte membrane from a heat resistant sulfonated aromatic polyether ketone is proposed (JP-A-6-93114).

Further, a structure wherein by sulfonating the polystyrene block of a block copolymer composed of styrene and a rubber component, the polystyrene block was made to be a cation-conductive channel is proposed. For example, as an inexpensive and mechanically and chemically stable polymer electrolyte membrane, a cation-conductive membrane composed of a sulfonated SEBS (abbreviation of polystyrene-poly (ethylene-butylene)-polystyrene triblock copolymer) is proposed (JP-A-10-503788).

Further, a cation-conductive membrane composed of a sulfonated SiBuS (abbreviation of polystyrene-polyisobutylene-polystyrene triblock copolymer) having an isobutylene skeleton excellent in chemical stability as a rubber component is proposed (JP-A-2001-210336).

On the other hand, as an anion-conductive polymer electrolyte membrane used in anion exchange-type fuel cells, one obtained by radiation graft polymerizing a monomer having an anion exchange group with a fluoropolymer base material is proposed (JP-A-2000-331693).

Further, as an anion-conductive polymer electrolyte membrane, an electrolyte membrane obtained by aminating a chloromethylated aromatic polysulfone-polythioethersulfone copolymer, and making a membrane of the resulting resin is proposed (JP-A-11-273965).

Further, as an anion-conductive polymer electrolyte membrane, an anion exchanger obtained by introducing a quaternary ammonium group in a copolymer composed of a polystyrene block and a polyolefin block is proposed (JP-B-2735693), and an anion exchanger obtained by bonding copolymers themselves each composed of a polystyrene block and a polyolefin block with a polyamine is proposed (JP-B-2996752).

DISCLOSURE OF INVENTION

However, as to cation-conducting polymer electrolyte membranes which have hitherto been reported, the sulfonated aromatic polyether ketone disclosed in JP-A-6-93114 is not sufficient in cation conductivity, and thus the performance of a fuel cell derived therefrom is not sufficient. Further, when the amount of sulfonation is increased for heightening cation conductivity, the membrane becomes fragile, and its handling becomes harder. The sulfonated SEBS (polystyrene-poly (ethylene-butylene)-polystyrene triblock copymer) disclosed in JP-A-10-503788 was revealed to be insufficient in radical resistance as a result of a test actually made by us. This means that when this membrane is used in a fuel cell, possible operation time is limited. As to JP-A-2001-210336, although it is exhibited in JP-A-2001-210336 that the sulfonated SiBuS has higher chemical stability compared to the sulfonated SEBS proposed in JP-A-10-503788, it is the actual situation that the amount of ion exchange after the Fenton reaction as an index of chemical stability is decreased to about ½, and its chemical stability could not be always said to be sufficient.

On the other hand, as to anion-conducting polymer electrolyte membranes which have hitherto been reported, the fluoropolymer electrolyte membrane disclosed in JP-A-2000-331693 has the same disadvantage as Nafion. The electrolyte membrane derived from the aromatic polysulfone-polythioethersulfone copolymer, disclosed in JP-A-11-273695, has the problem that it has high affinity to water, and deterioration of the electrolyte membrane itself progresses due to moisture contained in the reaction gas during power generation and/or water formed at the oxygen electrode and sufficient operation time cannot be secured. The electrolyte membranes each derived from the copolymer composed of a polystyrene block and a polyolefin block disclosed in JP-B-2735693 and JP-B-2996752 are not sufficient in oxidation stability.

As mentioned above, it is the actual situation that an improved polymer electrolyte membrane for polymer electrolyte fuel cells which is economical and has high durability has not been proposed.

The object of this invention is to provide a polymer electrolyte membrane for polymer electrolyte fuel cells which is economical, mild to the environment, excellent in moldability, and further excellent in chemical stability (radical stability and/or oxidation stability) and thus durability, and a membrane electrode assembly and a polymer electrolyte fuel cell each using the electrolyte membrane.

The present inventors have intensely studied for solving the above problems, and as a result, they found that a block copolymer which has, as its constituents, a polymer block (A) having as a unit an aromatic vinyl compound unit whose α-carbon is quaternary carbon, and a flexible polymer block (B), and wherein the polymer block (A) has ion-conducting groups, fulfils the above object, and completed the invention.

Namely, the invention relates to a polymer electrolyte membrane for polymer electrolyte fuel cells, comprising a block copolymer which comprises a polymer block (A) having as a main unit (=a main repeating unit) an aromatic vinyl compound unit whose α-carbon is quaternary carbon, and a flexible polymer block (B), and has ion-conducting groups on the polymer block (A).

In the above block copolymer, polymer block (A) and polymer block (B) have a property that they go into microphase separation and polymer block (A) themselves and polymer block (B) themselves gather, respectively, and since polymer block (A) has ion-conducting groups, continuous phases (ion channels) are formed by the gathering of polymer block (A) themselves and serve as paths of cations (usually, protons) or anions (usually, hydroxide ions). By the presence of polymer block (B), the block copolymer takes on elasticity and becomes flexible as a whole, and in production of membrane electrode assemblies and polymer electrolyte fuel cells, moldability (assembling properties, joint properties, fastening properties, etc.) is improved. Flexible polymer block (B) is composed of alkene units, conjugated diene units or the like.

The aromatic vinyl compound unit whose α-carbon is quaternary carbon includes an aromatic vinyl compound unit wherein the hydrogen atom bonded to the α-carbon is replaced with an alkyl group, a halogenated alkyl group or a phenyl group; etc.

The ion-conducting groups are bonded to polymer block (A), and this is necessary for heightening oxidation stability.

In the block copolymer used in the invention, the ion-conducting groups are monovalent cation-conducting groups or anion-conducting groups, and in the latter case, the polymer block (A) has monovalent anion-conducting groups, or polyvalent anion-conducting groups are bonded so as to crosslink the polymer blocks (A) and/or so as to crosslink the aromatic vinyl compound units inside the polymer block (A).

The cation-conducting group includes a sulfonic acid group and a phosphonic acid group and their salts.

The anion-conducting group includes an ammonium group optionally substituted with an alkyl group having 1 to 8 carbon atoms; a pyridinium group having a methyl group or an ethyl group bonded to the nitrogen atom or a pyridyl group which formed a salt with an acid; an imidazolium group having a methyl group or an ethyl group bonded to the nitrogen atom or an imidazolyl group which formed a salt with an acid; a phosphonium group optionally substituted with a methyl group or an ethyl group; a monovalent or bivalent group wherein at least one of the two nitrogen atoms of ethylenediamine whose hydrogen atom(s) bonded to the nitrogen atoms can be replaced with a methyl group or an ethyl group is a bonding site, a monovalent or bivalent group wherein at least one of the two nitrogen atoms of tri- to hexa-methylenediamine whose hydrogen atom(s) bonded to the nitrogen atoms can be replaced with a methyl group or an ethyl group is a bonding site; a monovalent or bivalent group wherein at least one of the two nitrogen atoms of methylenediamine wherein the hydrogen atom(s) bonded to the nitrogen atoms can be replaced with a methyl group or an ethyl group is a bonding site; a monovalent, bivalent or trivalent group wherein at least one of the three nitrogen atoms of diethylene (or bis(trimethylene))triamine wherein the hydrogen atom(s) bonded to the nitrogen atoms can be replaced with a methyl group or an ethyl group is a bonding site; etc.

The invention also relates to a membrane electrode assembly and a fuel cell each using the electrolyte membrane.

BEST MODE FOR CARRYING OUT THE INVENTION

Figure 1:
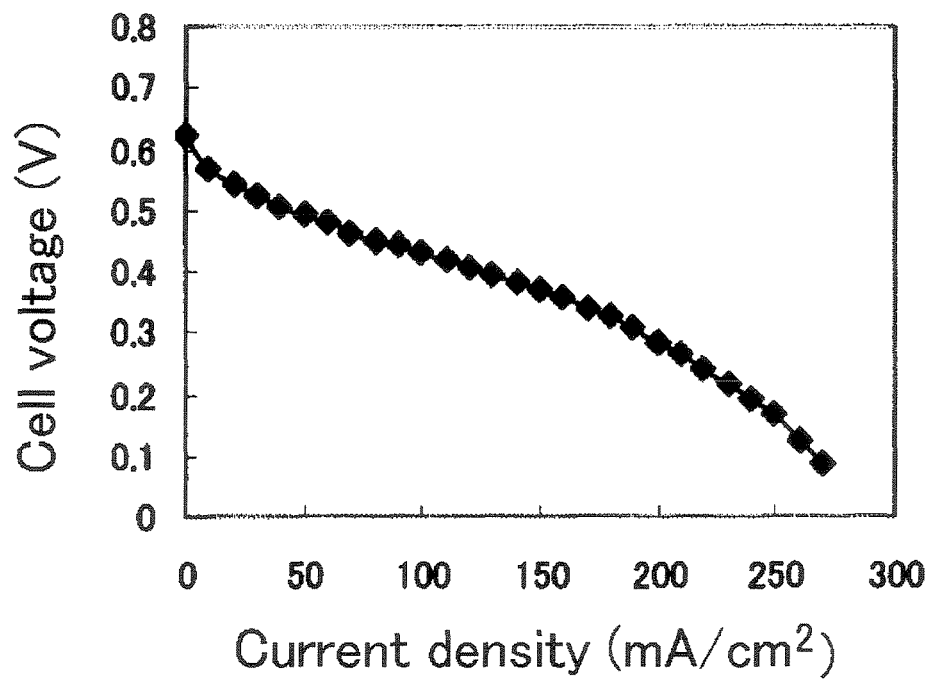
FIG. 1 is a drawing showing the current density-output voltage of a single cell for cation exchange-type polymer electrolyte fuel cells (Example 2 (3)).
Figure 2:
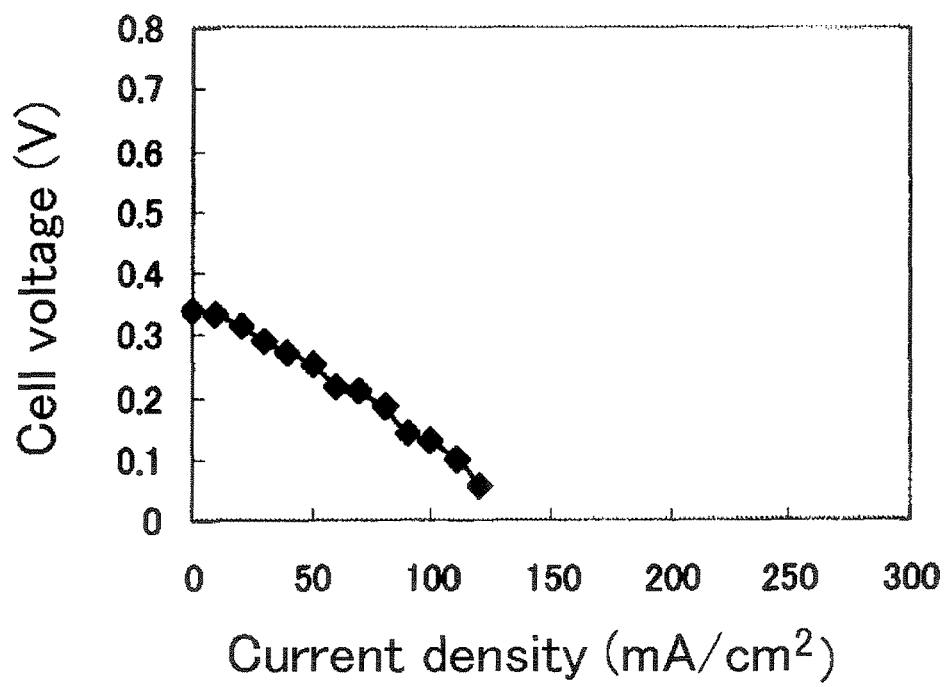
FIG. 2 is a drawing showing the current density-output voltage of a single cell for cation exchange-type polymer electrolyte fuel cells (Comparative example 2 (3)).
Figure 3:
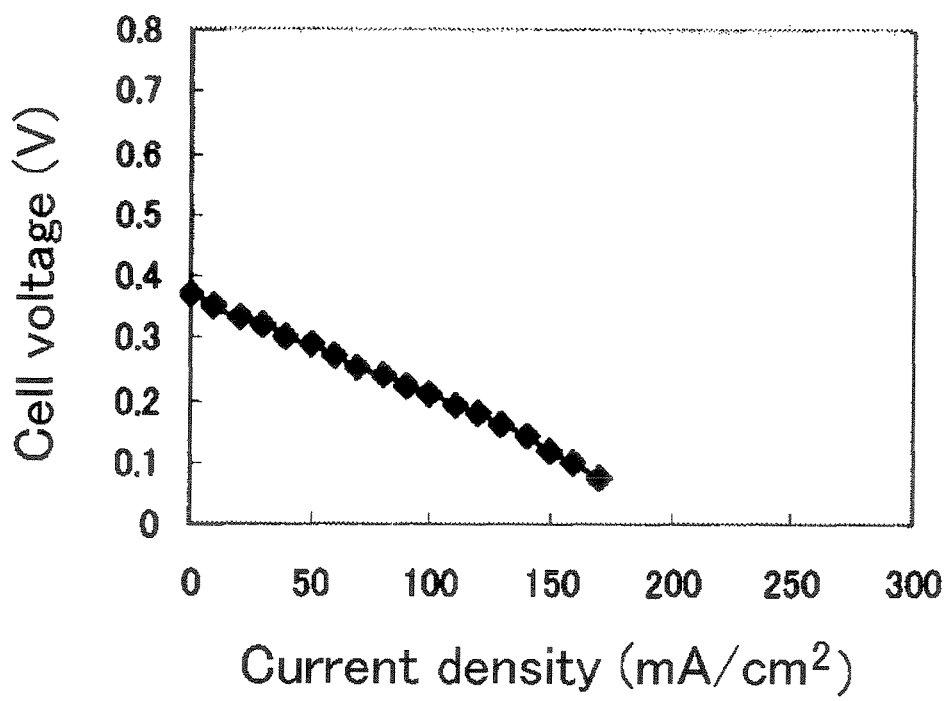
FIG. 3 is a drawing showing the current density-output voltage of a single cell for cation exchange-type polymer electrolyte fuel cells (Comparative example 4 (3)).
Figure 4:
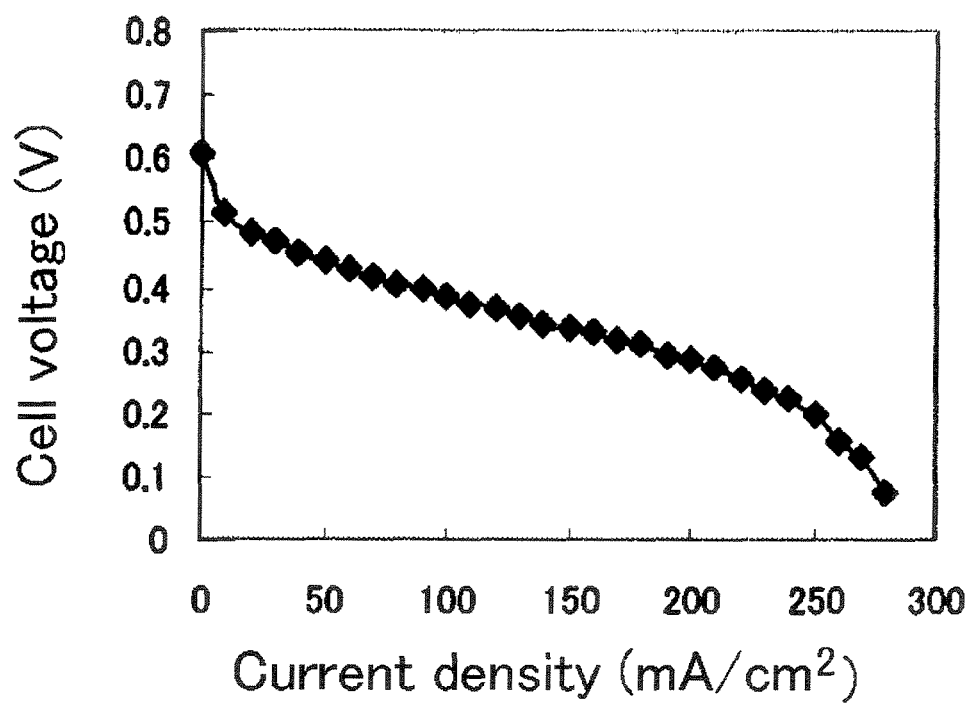
FIG. 4 is a drawing showing the current density-output voltage of a single cell for cation exchange-type polymer electrolyte fuel cells (Comparative example 5).

The invention is described in detail below. The block copolymer constituting the polymer electrolyte membrane of the invention has, as a constituent, a polymer block (A) having as a main unit (=a main repeating unit) an aromatic vinyl compound unit whose α-carbon is quaternary carbon, and having ion-conducting groups.

The aromatic vinyl compound whose α-carbon is quaternary carbon is preferably an aromatic vinyl compound wherein the hydrogen atom bonded to the α-carbon is replaced with an alkyl group having 1 to 4 carbon atoms (a methyl group, an ethyl group, a n-propyl group, an isopropyl group, a n-butyl group, an isobutyl group, a tert-butyl group or the like), a halogenated alkyl group having 1 to 4 carbon atoms (a chloromethyl group, a 2-chloroethyl group, a 3-chloroethyl group or the like) or a phenyl group. As the aromatic vinyl compound constituting the skeleton, there can be mentioned styrene, vinylnaphthalene, vinylanthracene, vinylpyrene, vinylpyridine, etc. The hydrogen atoms bonded to the aromatic ring of the aromatic vinyl compound can be replaced with 1 to 3 substituents, and as the substituents, there can be mentioned, each independently, alkyl groups each having 1 to 4 carbon atoms (methyl groups, ethyl groups, n-propyl groups, isopropyl groups, n-butyl groups, isobutyl groups, tert-butyl groups, etc.), halogenated alkyl groups each having 1 to 4 carbon atoms (chloromethyl groups, 2-chloroethyl groups, 3-chloroethyl groups, etc.), etc. As a preferred specific example of the aromatic vinyl compound whose α-carbon is quaternary carbon, there can be mentioned α-methylstyrene. The aromatic vinyl compounds whose α-carbon is quaternary carbon can be used alone or in a combination of two or more. When two or more are copolymerized, the form of the copolymerization can be random copolymerization, block copolymerization, graft copolymerization or tapered copolymerization.

Polymer block (A) can contain one or plural other monomer units so long as they do not spoil the effects of the invention. Such other monomers include, for example, aromatic vinyl compounds [styrene, styrene whose hydrogen atoms bonded to the benzene ring can be replaced with 1 to 3 alkyl groups (methyl groups, ethyl groups, n-propyl groups, isopropyl groups, n-butyl groups, isobutyl groups, tert-butyl groups, etc.), vinylnaphthalene, vinylanthracene, vinylpyrene, vinylpyridine, etc.]; conjugated dienes having 4 to 8 carbon atoms (specific examples are the same as in the description of polymer block (B) mentioned later); alkenes having 2 to 8 carbon atoms (specific examples are the same as in the description of polymer block (B) mentioned later); (meth)acrylic esters (methyl (meth)acrylate, ethyl (meth) acrylate, butyl (meth)acrylate, etc.); vinyl esters (vinyl acetate, vinyl propionate, vinyl butyrate, vinyl pivalate, etc.); vinyl ethers (methyl vinyl ether, isobutyl vinyl ether, etc.); etc. The form of the copolymerization of the aromatic vinyl compound whose α-carbon is quaternary carbon with the above other monomers needs to be random copolymerization.

The proportion of the aromatic vinyl compound unit whose α-carbon is quaternary carbon in polymer block (A) is preferably 50% by mass or more, more preferably 70% by mass or more, still more preferably 90% by mass or more, of polymer block (A), in view of giving sufficient oxidation stability to the polymer electrolyte membrane finally obtained.

The molecular weight of polymer block (A) is suitably chosen depending on the nature and state, desired performance, other polymer components, etc. of the polymer electrolyte membrane. When the molecular weight is large, dynamic characteristics such as tensile strength of the polymer electrolyte membrane tend to be higher, whereas when the molecular weight is small, the electric resistance of the polymer electrolyte membrane tens to be smaller, and it is important to suitably choose the molecular weight in accordance with necessary performance. Usually, the molecular weight is preferably chosen between 100 and 1,000,000, and more preferably chosen between 1,000 and 100,000, as number average molecular weight in terms of polystyrene.

The block copolymer used in the polymer electrolyte membrane of the invention has flexible polymer block (B) besides polymer block (A). Polymer block (A) and polymer block (B) have a property that they go into micro-phase separation and polymer block (A) themselves and polymer block (B) themselves gather, respectively, and since polymer block (A) has ion-conducting groups, ion channels as continuous phases are formed by the gathering of polymer block (A) themselves and serve as paths of cations (usually, protons) or anions (usually, hydroxide ions). By the presence of polymer block (B), the block copolymer takes on elasticity and becomes flexible as a whole, and in production of membrane electrode assemblies and polymer electrolyte fuel cells, moldability (assembling properties, joint properties, fastening properties, etc.) is improved. Such polymer block (B) is a so-called rubber-like polymer block whose glass transition point or softening point is 50° C. or less, preferably 20° C. or less, more preferably 10° C. or less.

As monomers capable of constituting the unit (=the repeating unit) constituting flexible polymer block (B), there can be mentioned alkenes having 2 to 8 carbon atoms; cycloalkenes having 5 to 8 carbon atoms; vinycycloalkenes having 7 to 10 carbon atoms; conjugated dienes having 4 to 8 carbon atoms; conjugated cycloalkadienes having 5 to 8 carbon atoms; vinycycloalkenes having 7 to 10 carbon atoms wherein part or all of the carbon-carbon double bonds are hydrogenated; conjugated dienes having 4 to 8 carbon atoms wherein part or all of the carbon-carbon double bonds are hydrogenated; conjugated cycloalkadienes having 5 to 8 carbon atoms wherein part or all of the carbon-carbon double bonds are hydrogenated; (meth)acrylic esters (methyl (meth)acrylate, ethyl (meth)acrylate, butyl (meth)acrylate, etc.); vinyl esters (vinyl acetate, vinyl propionate, vinyl butyrate, vinyl pivalate, etc.); vinyl ethers (methyl vinyl ether, isobutyl vinyl ether, etc.); etc. These can be used alone or in a combination of two or more. When two or more are copolymerized, the form thereof can be random copolymerization, block copolymerization, graft copolymerization or tapered copolymerization. When a monomer used in the (co)polymerization has two carbon-carbon double bonds, any of them can be used in the polymerization, and in the case of a conjugated diene either of 1,2-bond and 1,4-bond can be used in the polymerization, and so long as the glass transition point or softening point is 50° C. or less, there is no particular restriction on the proportion between 1,2-bond and 1,4-bond.

When the unit constituting polymer block (B) has a carbon-carbon double bond as in a vinylcycloalkene unit, a conjugated diene unit or a conjugated cycloalkadiene unit, it is preferred that 30% by mol or more of the carbon-carbon double bonds is hydrogenated, it is further preferred that 50% by mol or more of the carbon-carbon double bonds is hydrogenated, and it is still further preferred that 80% by mol or more of the carbon-carbon double bonds is hydrogenated, in view of enhancement of the power generation performance, heat deterioration resistance, etc. of membrane electrode assemblies using the polymer electrolyte membrane of the invention. The proportion of hydrogenation of the carbon-carbon double bonds can be calculated according to a method generally used, for example, a method of measuring iodine number, $^1$H-NMR measurement, or the like.

In view of giving elasticity, and thus good moldability in production of membrane electrode assemblies and polymer electrolyte fuel cells to block copolymers to be obtained, polymer block (B) is preferably a polymer block comprising at least one unit selected from an alkene unit having 2 to 8 carbon atoms; a cycloalkene unit having 5 to 8 carbon atoms, a vinylcycloalkene unit having 7 to 10 carbon atoms; a conjugated diene unit having 4 to 8 carbon atoms, a conjugated cycloalkadiene unit having 5 to 8 carbon atoms; a vinycycloalkenes unit having 7 to 10 carbon atoms wherein part or all of the carbon-carbon double bonds are hydrogenated; a conjugated diene unit having 4 to 8 carbon atoms wherein part or all of the carbon-carbon double bonds are hydrogenated; and a conjugated cycloalkadiene unit having 5 to 8 carbon atoms wherein part or all of the carbon-carbon double bonds are hydrogenated. From the above viewpoint, polymer block (B) is more preferably a polymer block comprising at least one unit selected from an alkene unit having 2 to 8 carbon atoms; a conjugated diene unit having 4 to 8 carbon atoms; and a conjugated diene unit having 4 to 8 carbon atoms wherein part or all of the carbon-carbon double bonds are hydrogenated. From the above viewpoint, polymer block (B) is still more preferably a polymer block comprising at least one unit selected from an alkene unit having 2 to 6 carbon atoms; a conjugated diene unit having 4 to 8 carbon atoms; and a conjugated diene unit having 4 to 8 carbon atoms wherein part or all of the carbon-carbon double bonds are hydrogenated. In the above, most preferably as the alkene unit having 2 to 6 carbon atoms is an isobutene unit, and most preferably as the conjugated diene unit is a 1,3-butadiene unit and/or an isoprene unit.

In the above, alkenes having 2 to 8 carbon atoms include ethylene, propylene, 1-butene, 2-butene, isobutene, 1-pentene, 2-pentene, 1-hexene, 2-hexene, 1-heptene, 2-heptene, 1-octene, 2-octene, etc.; cycloalkenes having 5 to 8 carbon atoms include cyclopentene, cyclohexene, cycloheptene, cyclooctene, etc.; vinylcycloalkenes having 7 to 10 carbon atoms include vinylcyclopentene, vinylcyclohexene, vinylcycloheptene, vinylcyclooctene, etc.; conjugated dienes having 4 to 8 carbon atoms include 1,3-butadiene, 1,3-pentadiene, isoprene, 1,3-hexadiene, 2,4-hexadiene, 2,3-dimethyl-1,3-butadiene, 2-ethyl-1,3-butadiene, 1,3-heptadiene, 1,4-heptadiene, 3,5-heptadiene, etc.; and conjugated cycloalkadienes having 5 to 8 carbon atoms include cyclopentadiene, 1,3-cyclohexadiene, etc.

Polymer block (B) can contain, besides the above monomer unit(s), another monomer unit, for example a unit of an aromatic vinyl compound such as styrene or vinylnaphthalene or a halogen-containing vinyl compound such as vinyl chloride, so long as it does not spoil the purposes of polymer block (B) of giving elasticity to the block copolymer. In this case, the form of the copolymerization of the above monomer with another monomer needs to be random copolymerization. The use amount of such another monomer is preferably less than 50% by mass, more preferably less than 30% by mass, still more preferably less than 10% by mass, based on the total of the above monomer and another monomer.

The structure of the block copolymer comprising polymer block (A) and polymer block (B) as constituents is not particularly limited, and there can be mentioned, as its examples, an A-B-A triblock copolymer, a B-A-B triblock copolymer, a mixture of an A-B-A triblock copolymer or a B-A-B triblock copolymer with an A-B diblock copolymer, an A-B-A-B tetrablock copolymer, an A-B-A-B-A pentablock copolymer, a B-A-B-A-B pentablock copolymer, an (A-B)$_n$X star form copolymer (X represents the residue of a coupling agent), a (B-A)$_n$X star form copolymer (X represents the residue of a coupling agent), etc. These block copolymers can be used alone or in a combination of two or more.

The mass ratio of polymer block (A) to polymer block (B) is preferably 95:5 to 5:95, more preferably 90:10 to 10:90 and most preferably 50:50 to 10:90. When this mass ratio is 95:5 to 5:95, it is advantageous for the ion channel formed with polymer block (A) by micro phase separation to be a continuous phase, and practically sufficient ion conductivity is displayed, and since the proportion of hydrophobic polymer block (B) gets appropriate and good water resistance is attained.

The block copolymer constituting the polymer electrolyte membrane of the invention can contain another polymer block (C) different from polymer block (A) and polymer block (B).

Polymer block (C) is not limited so long as it is a component going into micro phase separation from polymer block (A) and polymer block (B). As monomers capable of constituting polymer block (C), there can, for example, be mentioned aromatic vinyl compounds [styrene, styrene whose hydrogen atom(s) bonded to the benzene ring is/are replaced with 1 to 3 alkyl groups (methyl groups, ethyl groups, n-propyl groups, isopropyl groups, n-butyl groups, isobutyl groups, tert-butyl groups, etc.), vinylnaphthalene, vinylanthracene, vinylpyrene, etc.], conjugated dienes having 4 to 8 carbon atoms (specific examples are the same as those mentioned in the description of polymer block (B)), alkenes having 2 to 8 carbon atoms (specific examples are the same as those mentioned in the description of polymer block (B)), (meth)acrylic esters (methyl (meth)acrylate, ethyl (meth)acrylate, butyl (meth)acrylate, etc.), vinyl esters (vinyl acetate, vinyl propionate, vinyl butyrate, vinyl pivalate, etc.), vinyl ethers (methyl vinyl ether, isobutyl vinyl ether, etc.), etc.

When polymer block (C) is made to have the functions of going into micro phase separation from polymer block (A) and polymer block (B), having substantially no ionic groups and acting as a cramping phase, the polymer electrolyte membrane of the invention having such polymer block (C) tends to be excellent in shape and form stability, durability, and dynamic characteristics under a wet environment. In this case, as preferred examples of monomers constituting polymer block (C), there can be mentioned the above-mentioned aromatic vinyl compounds. It is also possible to give the above functions by making polymer block (C) crystalline.

When the aromatic vinyl compound unit is relied on for the above functions, the proportion of the aromatic vinyl compound unit in polymer block (C) is preferably 50% by mass or more, more preferably 70% by mass or more and still more preferably 90% by mass or more of polymer block (C). Further, from the same viewpoint as above, it is desirable that units other than the aromatic vinyl compound unit contained in polymer block (C) are in the state of random copolymerization.

In view of micro-phase separating polymer block (C) from polymer block (A) and polymer block (B) and at the same time making it function as a cramping phase, as particularly preferred examples of polymer block (C), there can be mentioned a polystyrene block; a polystyrene-type block such as a poly-p-methylstyrene block or a poly-p-(t-butyl)styrene block; a copolymer block using two or more of styrene, p-methylstyrene and p-(t-butyl)styrene in an arbitrary mutual proportion; a crystalline hydrogenated 1,4-polybutadiene block; a crystalline polyethylene block; a crystalline polypropylene block, etc.

As the forms of the block copolymer in the case of containing polymer block (C) used in the invention, there can be mentioned an A-B-C triblock copolymer, an A-B-C-A tetrablock copolymer, an A-B-A-C tetrablock copolymer, a B-A-B-C tetrablock copolymer, an A-B-C-B tetrablock copolymer, a C-A-B-A-C pentablock copolymer, a C-B-A-B-C pentablock copolymer, an A-C-B-C-A pentablock copolymer, an A-C-B-A-C pentablock copolymer, an A-B-C-A-B pentablock copolymer, an A-B-C-A-C pentablock copolymer, an A-B-C-B-C pentablock copolymer, an A-B-A-B-C pentablock copolymer, an A-B-A-C-B pentablock copolymer, a B-A-B-A-C pentablock copolymer, a B-A-B-C-A pentablock copolymer, a B-A-B-C-B pentablock copolymer, etc.

When the block copolymer constituting the polymer electrolyte membrane of the invention contains polymer block (C), the proportion of polymer block (C) in the block copolymer is preferably 40% by mass or less, more preferably 35% by mass or less and still more preferably 30% by mass or less.

The number average molecular weight of the block copolymer used in the invention, in a state that an ion-conducting group is not introduced, is not particularly limited, but, usually, is preferably 10,000 to 2,000,000, more preferably 15,000 to 1,000,000 and still more preferably 20,000 to 500,000 as number average molecular weight in terms of polystyrene.

The block copolymer constituting the polymer electrolyte membrane of the invention needs to have ion-conducting groups, namely cation-conducting groups or anion-conducting groups on polymer block (A). When ion conductivity is referred to in the invention, cations include protons, etc. and anions include hydroxide ions, etc.

The cation-conducting groups are not particularly limited so long as they are such groups that a membrane electrode assembly produced using the polymer electrolyte membrane of the invention can display sufficient cation conductivity, but above all, a sulfonic acid group or a phosphonic acid group or their salts represented by —SO$_3$M or —PO$_3$HM wherein M represents a hydrogen atom, an ammonium ion or an alkali metal ion, can be used preferably. As the alkali metal ion, there can be mentioned sodium ion, potassium ion, lithium ion, etc. As the cation-conducting group, a carboxyl group or its salts (e.g., ammonium salts, alkali metal salts) can also be used. The reason why the introduction site of the ion-conducting groups is made to be polymer block (A) is that it is particularly effective to heighten the chemical stability, particularly the radical resistance of the entire block copolymer.

The anion-conducting groups are not particularly limited so long as they are such groups that a membrane electrode assembly produced using the polymer electrolyte membrane of the invention can display sufficient anion conductivity, and groups as shown below are mentioned. The reason why the introduction site of the anion-conducting groups is made to be polymer block (A) is that it is particularly effective to heighten the chemical stability, particularly the oxidation stability of the entire block copolymer.

(1)

(2)

(3)

(4)

(5)

(6)

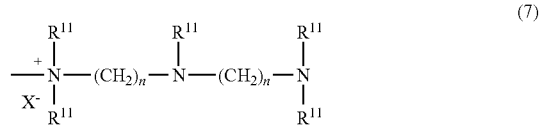
(7)

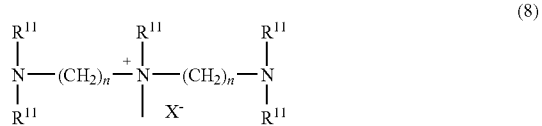
(8)

(9)

(10)

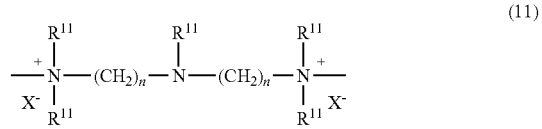
(11)

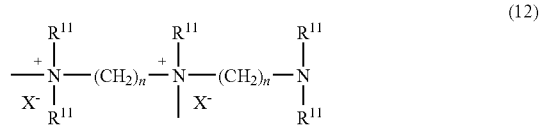
(12)

-continued

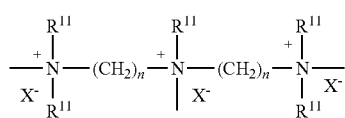

(13)

In the above formulae, $R^1$ to $R^3$ represent respectively independently hydrogen atoms or alkyl groups having 1 to 8 carbon atoms, $R^4$ to $R^9$ and $R^{11}$ represent respectively independently hydrogen atoms, methyl groups or ethyl groups, $R^{10}$ represents a methyl group or an ethyl group, X-represents a hydroxide ion or an acid anion, m represents an integer of 2 to 6, and n represents 2 or 3. In the above, as alkyl groups having 1 to 8 carbon atoms, there can be mentioned methyl groups, ethyl groups, n-propyl groups, isopropyl groups, n-butyl groups, n-pentyl groups, n-hexyl groups, n-heptyl groups, 2-ethylhexyl groups, etc. As the acid anion, there is no particular limitation, and there can, for example, be mentioned halide ion (particularly chloride ion), ½ $SO_4^{2-}$, $HSO_4^-$, p-toluenesulfonate anion, etc.

In the above, it is preferred for the realization of high anion conductivity that $R^1$ to $R^9$ and $R^{11}$ are methyl groups or ethyl groups, and $X^-$ is a hydroxide ion. It is further preferred that $R^1$ to $R^{11}$ are methyl groups.

As to the position of introduction of the cation-conducting groups into polymer block (A), there is no particular restriction, and they can be introduced either into the aromatic vinyl compound units whose α-carbon is quaternary carbon or into the afore-mentioned other monomer units, but in view of enhancement of chemical stability, particularly radical resistance, it is most desirable to introduce the cation-conducting groups into the aromatic ring of the aromatic vinyl compound units whose α-carbon is quaternary carbon.

As to the position of introduction of the anion-conducting groups into polymer block (A), there is no particular restriction, and they can be introduced either into the aromatic vinyl compound units whose α-carbon is quaternary carbon or into the afore-mentioned other monomer units, but in view of enhancement of chemical stability, particularly oxidation stability, it is most desirable to introduce the anion-conducting groups into the aromatic ring of the aromatic vinyl compound units whose α-carbon is quaternary carbon. In these cases, when the anion-conducting group introduced is a monovalent group such as one of (1) to (8) in the above formulae, the group is bonded to polymer block (A), but when it is a polyvalent group such as one of (9) to (13) in the above formulae, the group is bonded so as to crosslink polymer blocks (A) themselves or so as to crosslink aromatic vinyl compound units themselves in polymer block (A).

The amount of the ion-conducting group introduced is appropriately chosen depending on the required performance of a block copolymer obtained, etc., but, usually, in order to display sufficient ion conductivity to use it as a polymer electrolyte membrane for polymer electrolyte fuel cells, the introduction amount is preferably such an amount that the ion exchange capacity of the block copolymer becomes 0.30 meq/g or more, and is more preferably such an amount that the ion exchange capacity of the block copolymer becomes 0.40 meq/g or more. As to the upper limit of the ion exchange capacity of the block copolymer, since the ion exchange capacity becomes too large, a tendency occurs that hydrophilicity increases and water resistance becomes insufficient, it is preferred that the ion exchange capacity is 3.0 meq/g or less.

When polymer block (A) in which the ion-conducting group is introduced is constituted by an aromatic vinyl compound wherein the hydrogen atom bonded to the α-carbon is replaced with an alkyl group having 1 to 4 carbon atoms, for example α-methylstyrene, the solubility parameter of polymer block (A) becomes smaller and hydrophobicity inside the ion channel which polymer block (A) forms as a result of microphase separation is heightened, compared to the case where polymer block (A) is constituted by an aromatic vinyl compound unit whose α-carbon is tertiary carbon. Thereby, in fuel cells using methanol as a fuel, it tends to be easier to inhibit a phenomenon that methanol passes through the electrolyte membrane from one electrode side to the other electrode side (methanol crossover). When another monomer whose solubility parameter is further smaller than that of α-methylstyrene is (co)polymerized, it tends to be further easier to inhibit methanol crossover.

Processes for producing a block copolymer used in the invention are mainly classified into two processes. Namely, they are (1) a process which comprises producing a block copolymer not having an ion-conducting group and then bonding an ion-conducting group, and (2) a process which comprises producing a block copolymer using a monomer having an ion-conducting group.

The first process is described below.

Depending on the kind, molecular weight, etc. of monomer(s) constituting polymer block (A) or (B), the process for producing polymer block (A) or (B) is appropriately chosen from a radical polymerization method, an anion polymerization method, a cation polymerization method, a coordination polymerization method and so on, but in view of industrial easiness, a radical polymerization method, an anion polymerization method or a cation polymerization method is preferably chosen. Particularly, in view of molecular weight, molecular weight distribution, the structure of the polymer, easiness of bond to polymer block (B) composed of flexible component(s) or polymer block (A) and so on, a so-called living polymerization method is preferred, and, specifically, a living radical polymerization method, a living cation polymerization method or a living anion polymerization method is preferred.

As specific examples of the production process, a process for producing a block copolymer having its components polymer block (A) composed of poly (α-methylstyrene) and polymer block (B) composed of poly (conjugated diene), and a process for producing a block copolymer having its components polymer block (A) composed of poly (α-methylstyrene) and polymer block (B) composed of polyisobutene are described below. In these cases, in view of industrial easiness, molecular weight, molecular weight distribution, easiness of bond between polymer block (A) and polymer block (B) and so on, it is preferred to produce these block copolymers according to a living anion polymerization method or a living cation polymerization method, and specific synthetic examples as follows can be utilized.

(1) a process of obtaining an A-B-A block copolymer by polymerizing a conjugated diene in tetrahydrofuran as a solvent using a dianion initiator, and then successively polymerizing α-methylstyrene under a temperature condition of −78° C. (Macromolecules, (1969), 2(5), 453-458), (2) a process of obtaining an (A-B)$_n$X block copolymer by bulk polymerizing α-methylstyrene using an anion initiator, successively polymerizing a conjugated diene, and then conducting coupling reaction with a coupling agent such as tetrachlorosilane (Kautsch. Gummi, Kunstst., (1984), 37(5), 377-379; Polym. Bull., (1984), 12, 71-77), (3) a process of obtaining an A-B-A block copolymer by polymerizing α-methylstyrene of a concentration of 5 to 50% by mass in a nonpolar solvent in the presence of a polar compound of a concentration of 0.1 to 10% by mass at a temperature of −30° C. to 30° C. using an organic lithium compound as an initiator, polymerizing a conjugated diene with the resulting living polymer, and then adding a coupling agent, (4) a process of obtaining an A-B-C block copolymer by polymerizing α-methylstyrene of a concentration of 5 to 50% by mass in a nonpolar solvent in the presence of a polar compound of a concentration of 0.1 to 10% by mass at a temperature of −30° C. to 30° C. using an organic lithium compound as an initiator, polymerizing a conjugated diene with the resulting living polymer, and then polymerizing a monomer constituting polymer block (C) with the resulting living polymer of the block copolymer composed of the α-methylstyrene polymer block and the conjugated diene polymer block, (5) a process of obtaining an A-B-A block copolymer by cation polymerizing isobutene in a mixed solvent of a halogenated hydrocarbon and a hydrocarbon in the presence of a Lewis acid at a temperature of −78° C. using a bifunctional organic halogen compound, addition reacting diphenylethylene, further adding the Lewis acid, and then polymerizing α-methylstyrene (Macromolecules, (1995), 28, 4893-4898), and (6) a process of obtaining an A-B-A block copolymer by polymerizing α-methylstyrene in a mixed solvent of a halogenated hydrocarbon and a hydrocarbon in the presence of a Lewis acid at a temperature of −78° C. using a monofunctional organic halogen compound, further adding the Lewis acid, polymerizing isobutene, and then conducting coupling reaction with a coupling agent such as 2,2-bis-[4-(1-phenylethenyl)phenyl]propane (Polym. Bull., (2000), 45, 121-128).

When a block copolymer having as its components polymer block (A) composed of poly (α-methylstyrene) and polymer block (B) composed of a conjugated diene is produced, the processes of (3) and (4) are adopted as preferred processes, and, particularly, the process of (3) is adopted as a further preferred process, among the above specific production processes for the block copolymer.

When a block copolymer having as its components polymer block (A) composed of poly (α-methylstyrene) and polymer block (B) composed of isobutene is produced, the known process shown in (5) or (6) is adopted.

A process for bonding an ion-conducting group to the resulting block copolymer is described below.

First, a process for introducing a cation-conducting group into the resulting block copolymer is described.

Thereamong, first, a process for introducing a sulfonic acid group into the resulting block copolymer is described. Sulfonation can be conducted by a known sulfonation method. As such a method, there can be exemplified a process of preparing a solution or suspension of the block copolymer in an organic solvent, and then adding a sulfonating agent and conducting mixing, a process of directly adding a gaseous sulfonating agent to the block copolymer, and the like.

As the sulfonating agent to be used, there can be exemplified sulfuric acid, a mixture system of sulfuric acid and an aliphatic acid anhydride, chlorosulfonic acid, a mixture system of chlorosulfonic acid and trimethylsilyl chloride, sulfur trioxide, a mixture system of sulfur trioxide and triethyl phosphate, and, further, an aromatic organic sulfonic acid represented by 2,4,6-trimethylbenzenesulfonic acid, and so on. Further, as the organic solvent to be used, there can be exemplified a halogenated hydrocarbon such as methylene chloride, a straight-chain aliphatic hydrocarbon such as hexane, a cyclic aliphatic hydrocarbon such as cyclohexane, and so on, and they can be used also with an appropriate selection from plural combinations thereof, if necessary.

Next, a process for introducing a phosphonic acid group into the resulting block copolymer is described. Phosphonation can be conducted by a known phosphonation method. Specifically, there can, for example, be mentioned a process of preparing a solution or suspension of the block copolymer in an organic solvent, reacting the copolymer with chloromethyl ether or the like in the presence of anhydrous aluminum chloride to introduce halomethyl groups into the aromatic rings, reacting the resulting copolymer with phosphorus trichloride and anhydrous aluminum chloride added, and then conducting hydrolysis reaction to introduce phosphonic acid groups; and so on. There can further be exemplified a process of adding phosphorus trichloride and anhydrous aluminum chloride to the copolymer and reacting them to introduce phosphinic groups into the aromatic rings, and then oxidizing the phosphinic groups into phosphonic groups with nitric acid; and so on.

As to the degree of sulfonation or phosphonation, it is desirable to conduct sulfonation or phosphonation until the ion exchange capacity of the resulting block copolymer becomes 0.30 meq/g or more, particularly 0.40 meq/g or more, but so that the ion exchange capacity is 3.0 meq/g or less. By this, practical ion conductivity performance can be obtained. The ion exchange capacity of the sulfonated or phosphonated block copolymer, or sulfonation proportion or phosphonation proportion in polymer block (A) of the block copolymer can be calculated using an analytic method such as an acid value titration method, infrared spectroscopy, measurement of nuclear magnetic resonance spectrum ($^1$H-NMR spectrum) or the like.

Secondly, a process for introducing an anion-conducting group into the resulting block copolymer is described. Introduction of an anion-conducting group can be conducted by a known method. For example, the obtained block copolymer is chloromethylated, and then reacted with an amine or a phosphine, and, if necessary, the chloride ions are replaced with hydroxide ions or other acid anions.

The above-mentioned chloromethylation method is not particularly restricted, and a known method can be used. For example, a process of adding a chloromethylating agent and a catalyst into a solution or suspension of the block copolymer in an organic solvent to chloromethylate the block copolymer can be used. As the organic solvent, there can be exemplified a halogenated hydrocarbon such as chloroform or dichloroethane, but the organic solvent is not limited thereto. As the chloromethylating agent, chloromethyl ether, hydrochloric acid-paraformaldehyde or the like can be used, and as the catalyst, tin chloride, zinc chloride or the like can be used.

The method for reacting an amine or a phosphine with the chloromethylated block copolymer is not particularly restricted, and a known method can be used. For example, there can be used a process of adding an amine or phosphine as it is or, if necessary, as a solution in an organic solvent to a solution or suspension of the resulting chloromethylated block copolymer in an organic solvent, or a membrane formed from the solution or suspension according to a known method, and thereby progressing reaction. As an organic solvent for preparing a solution or suspension in the organic solvent, methanol, acetone or the like can be exemplified, but the organic solvent is not limited thereto.

As the amine or phosphine, there is no particular restriction, but such ones as shown below can be used preferably.

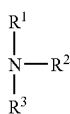 (1)

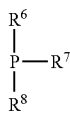 (2)

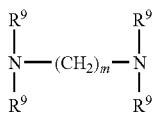 (3)

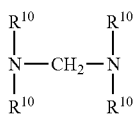 (4)

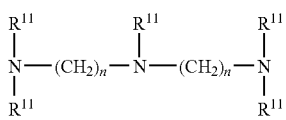 (5)

In the above formulae, $R^1$ to $R^3$, $R^6$ to $R^{11}$, m and n have the same meanings as defined hereinbefore. Namely, $R^1$ to $R^3$ represent respectively independently hydrogen atoms or alkyl groups having 1 to 8 carbon atoms, $R^6$ to $R^9$ and $R^{11}$ represent respectively independently hydrogen atoms, methyl groups or ethyl groups, $R^{10}$ represents a methyl group or an ethyl group, m represents an integer of 2 to 6, and n represents 2 or 3. $R^1$ to $R^3$, $R^6$ to $R^9$ and $R^{11}$ are preferably, respectively independently, methyl groups or ethyl groups, and $R^1$ to $R^3$ and $R^6$ to $R^{11}$ are more preferably methyl groups.

By the reaction of the chloromethylated block copolymer with the amine or phosphine, an anion-conducting group as mentioned hereinbefore is introduced. When monoamine (1) or phosphine (2) is used, an anion-conducting group is introduced into polymer block (A), whereas when a polyamine such as diamine (3) or (4) or triamine (5) is used, it is considered that the polyamine is sometimes introduced as a monovalent anion-conducting group into polymer block (A), and is sometimes introduced as a polyvalent anion-conducting group and crosslinks polymer blocks (A) themselves and/or crosslinks the aromatic vinyl compound units themselves within polymer block (A).

When $R^1$ to $R^3$ are alkyl groups each having 1 to 8 carbon atoms or $R^6$ to $R^9$ and $R^{11}$ are methyl groups or ethyl groups, the anion-conducting group comes to have quaternary ammonium group(s) or quaternary phosphonium group(s).

Since the anion-conducting group introduced has a chloride ion as the acid anion, the chloride ion is, if necessary, converted to a hydroxide ion or another acid anion, preferably to a hydroxide ion. The method for converting the chloride ion to another ion is not particularly restricted, and a known method can be used. For example, when it is converted to a hydroxide ion, a process of immersing the block copolymer with the anion-conducting group introduced into an aqueous solution of sodium hydroxide or potassium hydroxide can be exemplified.

The amount of the anion-conducting group introduced is, as already stated, desirably such an amount that the ion exchange capacity of the block copolymer becomes 0.30 meq/g or more, and more preferably such an amount that the ion exchange capacity of the block copolymer becomes 0.40 meq/g or more. By this, practical anion conductivity performance can be obtained. The ion exchange capacity of the block copolymer into which an anion-conducting group was introduced can be measured using an analytic method such as a titration method, infrared spectroscopic analysis, measurement of nuclear magnetic resonance spectrum ($^1$H-NMR spectrum) or the like.

The second process for producing a block copolymer used in the invention is a process of producing the block copolymer using at least one monomer having an ion-conducting group.

As the monomer having a cation-conducting group, a monomer wherein a cation-conducting group is bonded to an aromatic vinyl compound is preferred. Specifically, there can be mentioned styrenesulfonic acid, α-alkyl-styrenesulfonic acid, vinylnaphthalenesulfonic acid, α-alkyl-vinylnaphthalenesulfonic acid, vinylanthracenesulfonic acid, α-alkyl-vinylanthracenesulfonic acid, vinylpyrenesulfonic acid, α-alkyl-vinylpyrenesulfonic acid, styrenephosphonic acid, α-alkyl-styrenephosphonic acid, vinylnaphthalenephosphonic acid, α-alkyl-vinylnaphthalenephosphonic acid, vinylanthracenephosphonic acid, α-alkyl-vinylanthracenephosphonic acid, vinylpyrenephosphonic acid, α-alkyl-vinylpyrenephosphonic acid, etc. Among them, in view of industrial general-purpose properties, easiness of polymerization and the like, o-, m- or p-styrenesulfonic acid and α-alkyl-o-, m- or p-styrenesulfonic acid are particularly preferred.

As the monomer having a cation-conducting group, a monomer wherein a cation-conducting group is bonded to a conjugated diene compound can also be used. Specifically, there can be mentioned 1,3-butadiene-1-sulfonic acid, 1,3-butadiene-2-sulfonic acid, isoprene-1-sulfonic acid, isoprene-2-sulfonic acid, 1,3-butadiene-1-phosphonic acid, 1,3-butadiene-2-phosphonic acid, isoprene-1-phosphonic acid, isoprene-2-phosphonic acid, etc.

As the monomer having a cation-conducting group, there can also be used vinylsulfonic acid, α-alkyl-vinylsulfonic acid, vinylalkylsulfonic acid, α-alkyl-vinylalkylsulfonic acid, vinylphosphonic acid, α-alkyl-vinylphosphonic acid, vinylalkylphosphonic acid, α-alkyl-vinylalkylphosphonic acid, etc. Among them, vinylsulfonic acid and vinylphosphonic acid are preferred.

As the monomer having a cation-conducting group, there can further be used a (meth)acrylic monomer to which a cation-conducting group is bonded. Specifically, methacrylic acid, acrylic acid, 2-acrylamido-2-methyl-1-propanesulfonic acid, etc. can be mentioned.

The cation-conducting group can be introduced in the form of a salt neutralized with a proper metal ion (e.g., an alkali metal ion) or a counter ion (e.g., an ammonium ion). For example, by producing a polymer using sodium o-, m- or p-styrenesulfonate or sodium α-methyl-o-, m- or p-styrenesulfonate, a desired ion-conducting group can be introduced. A block copolymer wherein the sulfonic acid group is converted to a salt form can also be obtained by ion exchange using a suitable method.

As a monomer having an anion-conducting group, groups as shown below can be used.

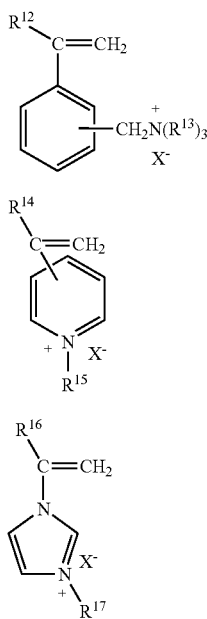

(1)

(2)

(3)

In the formulae, $R^{12}$, $R^{14}$ and $R^{16}$ represent hydrogen atoms, alkyl groups having 1 to 4 carbon atoms, halogenated alkyl groups having 1 to 4 carbon atoms or phenyl groups, $R^{13}$ represents a hydrogen atom or an alkyl group having 1 to 8 carbon atoms, $R^{15}$ and $R^{17}$ represent hydrogen atoms, methyl groups or ethyl groups, $X^-$ represents a hydroxide ion or an acid anion. In the above, there can be mentioned methyl groups, ethyl groups, n-propyl groups, isopropyl groups, isobutyl groups, etc. as the alkyl groups having 1 to 4 carbon atoms, and chloromethyl groups, chloroethyl groups, chloropropyl groups, etc. as the halogenated alkyl groups having 1 to 4 carbon atoms. As the alkyl group having 1 to 8 carbon atoms, there can be mentioned a methyl group, an ethyl group, a n-propyl group, an isopropyl group, a n-butyl group, a n-pentyl group, a n-hexyl group, a n-heptyl group, a 2-ethylhexyl group, etc. The acid anion is not particularly restricted, and there can, for example, be mentioned a halide ion (particularly, chloride ion), ½ $SO_4^{2-}$, $HSO_4^-$, p-toluene-sulfonate anion, etc. As $R^{12}$ to $R^{17}$, methyl groups or ethyl groups are preferred, and methyl groups are further preferred. In the above formula (2), the —$C(R^{14})$=$CH_2$ group is preferably bonded to the 4- or 2-position.

Among the monomers having an anion-conducting group, monomers represented by the formula (1) wherein $R^{13}$ is a methyl group or an ethyl group, particularly a methyl group are preferred above all.

As to the block copolymer having cation-conducting groups used in the invention, in the radical stability test at 60° C. which is conducted by adding the block copolymer to a radical reaction reagent obtained by dissolving D-glucose and iron (II) chloride tetrahydrate in an aqueous 3% by mass hydrogen peroxide solution, the mass retention proportion of the block copolymer after 8 hours is preferably 93% or more in view of long-term stability of cell characteristics. Further, in the same radical stability test at 60° C., the ion exchange capacity retention proportion of the block copolymer after 8 hours is preferably 50% or more, more preferably 60% or more, and still more preferably 70% or more.

Further, as to the block copolymer having anion-conducting groups used in the invention, in the oxidation stability test at 60° C. which is conducted by adding the block copolymer to an aqueous 3% by mass hydrogen peroxide solution, the mass retention proportion of the block copolymer after 8 hours is preferably 85% or more and more preferably 90% or more, in view of long-term stability of cell characteristics.

The polymer electrolyte membrane of the invention can, if necessary, contain, in addition to the block copolymer used in the invention, a softening agent, in such a range that the effects of the invention are not spoiled. As the softening agent, there are petroleum-type softening agents such as paraffin-, naphthene- or aroma-process oils; paraffins; vegetable oil-type softening agents; plasticizers; etc., and they can be used alone or in a combination of two or more.

The polymer electrolyte membrane of the invention can, if necessary, further contain, in such a range that the effects of the invention are not spoiled, various additives, for example, phenol-type stabilizers, sulfur-type stabilizers, phosphorus-type stabilizers, light stabilizers, antistatic agents, mold release agents, flame retardants, foaming agents, pigments, dyes, brighteners, carbon fiber, etc. alone in a combination of two or more. As specific examples of the stabilizers, there can be mentioned phenol-type stabilizers such as 2,6-di-t-butyl-p-cresol, pentaerythrityl tetrakis [3-(3,5-di-t-butyl-4-hydroxyphenyl)propionate], 1,3,5-trimethyl-2,4,6-tris(3,5-di-t-butyl-4-hydroxybenzyl)benzene, octadecyl 3-(3,5-di-t-butyl-4-hydroxyphenyl) propionate, triethylene glycol bis[3-(3-t-butyl-5-methyl-4-hydroxyphenyl)propionate], 2,4-bis(n-octylthio)-6-(4-hydroxy-3,5-di-t-butylanilino)-1,3,5-triazine, 2,2-thio-diethylenebis [3-(3,5-di-t-butyl-4-hydroxyphenyl)propionate], N,N'-hexamethylenebis(3,5-di-t-butyl-4-hydroxy-hydrocinnamide), 3,5-di-t-butyl-4-hydroxy-benzylphsphonate diethyl ester, tris-(3,5-di-t-butyl-4-hydroxybenzyl) isocyanurate and 3,9-bis{2-[3-(3-t-butyl-4-hydroxy-5-methylphenyl)propionyloxy]-1,1-dimethylethyl}-2,4,8,10-tetraoxaspiro[5,5]undecane; sulfur-type stabilizers such as pentaerythrityl tetrakis(3-laurylthiopropionate), distearyl 3,3'-thiodipropionate, dilauryl 3,3'-thiodipropionate and dismyristyl 3,3'-thiodipropionate; phosphorus-type stabilizers such as tris(nonylphenyl) phosphite, tris(2,4-di-t-butylphenyl) phosphite, distearyl pentaerythritol diphosphite, bis(2,6-di-t-butyl-4-methylphenyl) pentaerythritol diphosphite; etc. These stabilizers can be used alone or in a combination of two or more.

The polymer electrolyte membrane of the invention can, if necessary, further contain, in such a range that the effects of the invention are not spoiled, an inorganic filler. As specific examples of the inorganic filler, there can be mentioned talc, calcium carbonate, silica, glass fiber, mica, kaolin, titanium oxide, montmorillonite, alumina, etc.

The content of the block copolymer of the invention in the polymer electrolyte membrane of the invention is preferably 50% by mass or more, more preferably 70% by mass or more and further more preferably 90% by mass or more, in view of ion conductivity.

In view if performance, membrane strength, handling properties, etc. necessary as an electrolyte membrane for fuel cells, the thickness of the polymer electrolyte membrane of the invention is preferably on the order of 5 to 500 μm. When the membrane thickness is less than 5 μm, the mechanical strength and gas shutoff properties of the membrane tend to be insufficient. Conversely, when the membrane thickness goes beyond 500 μm and is too thick, the electric resistance of the membrane becomes large and sufficient ion conductivity is not displayed, and as a result, the power generation characteristics of the cells tends to be lowered. The membrane thickness is preferably 10 to 300 μm.

As to a process for preparing the polymer electrolyte membrane of the invention, any process can be adopted so long as it is a usual process for such preparation, and, for example, there can be used a process which comprises mixing a block copolymer constituting the polymer electrolyte membrane of the invention, or the block copolymer and additives as mentioned above with a suitable solvent to dissolve or suspend the block copolymer, casting the resulting solution or suspension onto a sheet material such as glass or applying it on such a material using a coater, an applicator or the like, and then removing the solvent under an appropriate condition to obtain an electrolyte membrane having a desired thickness; a process of making a membrane using a known method such as press thermoforming, roll thermoforming or extrusion molding; etc.

It is also possible to build up a new layer on the obtained electrolyte membrane layer by applying a solution of a block copolymer which is the same or different thereon and then drying it. It is further possible to form a laminate by press binding the same or different electrolyte membranes themselves obtained in the same way as mentioned above, by roll thermoforming or the like.

A solvent to be used in a case as mentioned above is not particularly restricted so long as it does not destroy the structure of the block copolymer and is capable of preparing a solution having a viscosity of the order to make its casting or application possible. Specifically, there can be exemplified halogenated hydrocarbons such as methylene chloride; aromatic hydrocarbons such as toluene, xylene and benzene; straight-chain aliphatic hydrocarbons such as hexane and heptane; cyclic aliphatic hydrocarbons such as cyclohexane; ethers such as tetrahydrofuran; and alcohols such as methanol, ethanol, propanol, isopropanol, butanol and isobutyl alcohol; and mixed solvents thereof, etc. According to the constitution, molecular weight, ion exchange capacity, etc. of the block copolymer, one or a combination of two or more can appropriately be chosen and used among the solvents exemplified above.

The condition of removal of the solvent used can arbitrarily be chosen so long as it is a condition to make it possible to completely remove the solvent at a temperature lower than a temperature at which the ion-conducting groups of the block copolymer of the invention drop off. In order to display desired physical properties, it is possible to combine plural temperatures arbitrarily and/or combine conditions of under draft and under vacuum and so on arbitrarily. Specifically, there can be exemplified a process of conducting preliminary drying under a vacuum condition of room temperature to 60° C. for several hours and then conduction drying under a vacuum condition of 100° C. or more, preferably 100 to 120° C. for 12 hours or so to remove the solvent; etc., but the process for removal of the solvent is not limited thereto.

The electrolyte membrane obtained can be washed with distilled water or an organic solvent not dissolving the membrane so as to remove low molecular weight compounds, etc. remaining in the membrane. As a pretreatment of the washing, when a block copolymer having anion-conducting groups is used, it is possible to adopt a process of immersing the block copolymer in an aqueous basic solution of sodium hydroxide or the like so as to convert the anion-conducting group to a complete hydroxide-type one.

A membrane electrode assembly using the polymer electrolyte membrane of the invention is described below. As to production of the membrane electrode assembly, there is no particular restriction, and a known process can be applied. For example, there can be mentioned a process of applying a catalyst paste containing an ion-conducting binder onto a gas diffusion layer by a printing method or a spraying method and drying the paste to form a junction product of the catalyst layer and the gas diffusion layer, and then binding a pair of the junction products, with each catalyst layer being made to be inside, to both sides of the polymer electrolyte membrane by a hot press or the like; or a process applying the catalyst paste onto both sides of the polymer electrolyte membrane by a printing method or a spraying method and drying the paste to form a catalyst layer, and then press binding a gas diffusion layer onto each catalyst layer by a hot press or the like. As still another production process, there is a process of applying a solution or suspension containing an ion-conducting binder onto both sides of the polymer electrolyte membrane and/or onto the surfaces of the catalyst layers in a pair of gas diffusion electrodes, binding the electrolyte membrane and the surfaces of the catalyst layers together, and then making them adhere with heating under pressurization or the like. In this case, the solution or suspension can be applied onto any one or both of the electrolyte membrane and the surfaces of the catalyst layers. As further still another production process, there is a process of applying the above catalyst paste onto a film substrate such as one made of polytetrafluoroethylene (PTFE) and drying the paste to form a catalyst layer, transferring a pair of the catalyst layers on the film substrates onto both sides of the polymer electrolyte membrane by binding under heating and pressing, peeling off the film substrate to obtain a junction product of the electrolyte membrane and the catalyst layer, and then press binding a gas diffusion layer onto each catalyst layer. When the ion-conducting group is a cation-conducting group, it is possible to conduct the above process in a state that the cation-conducting group is made to a salt with a metal such as Na, and restore the proton type by acid treatment after the joint. When the ion-conducting group is an anion-conducting group, it is possible to conduct the above process in such a state that the anion-conducting group is made to be a salt such as a chloride, and restore the hydroxide form by alkali treatment after the joint.

As the cation-conducting binder constituting the membrane electrode assembly, there can, for example, be used an ion-conducting binder composed of an existing perfluorocarbonsulfonic acid-type polymer such as "Nafion" (trade mark, made by Dupont Co.) or "Gore-select" (trade mark, made by Gore Co.); an ion-conducting binder composed of a sulfonated polyether sulfone or a sulfonated polyether ketone; an ion-conducting binder composed of a polybenzimidazole impregnated with phosphoric acid or sulfuric acid; or the like. As the anion-conducting binder constituting the membrane electrode assembly, there can, for example, be used an anion-conducting binder obtained by reacting polychloromethylstyrene with a tertiary amine to give a quaternary ammonium salt and, if necessary, converting it to the form of a hydroxide; or the like.

It is also possible to make an ion-conducting binder of the block copolymer constituting the polymer electrolyte membrane of the invention. For further heightening the adhesion between the electrolyte membrane and the gas diffusion electrode, it is preferred to use an ion-conducting binder made of the same material as the polymer electrolyte membrane.

As to the constitutive materials of the catalyst layer in the membrane electrode assembly, there is no particular restriction as an electrically conductive material/catalyst support, and, for example, a carbon material is mentioned. As the carbon material, there can be mentioned carbon blacks such as furnace black, channel black and acetylene black; active carbon; graphite, etc., and these can be used alone or as a mixture of two or more. As the catalyst metal, any metal can be used so long as it is a metal which promotes oxidation reaction of the fuel such as hydrogen or methanol and reduction reaction of oxygen, and there can, for example, be mentioned platinum, gold, silver, palladium, iridium, rhodium, ruthenium, iron, cobalt, nickel, chromium, tungsten, manganese, etc., and their alloys such as a platinum-ruthenium alloy. Among them, platinum or a platinum alloy is used in many cases. The particle size of a metal as the catalyst is, usually, 10 to 300 angstroms. It is advantageous in view of costs to carry such a catalyst on an electrically conductive material/catalyst support such as carbon because of less use amount of the catalyst. If necessary, it is possible to make the catalyst layer contain a water repellent. As the water repellent, there can, for example, be mentioned various thermoplastic resins such as polytetrafluoroethylene, polyvinylidene fluoride,
a styrene-butadiene copolymer and a poly(ether ether ketone).

The gas diffusion layer of the membrane electrode assembly is composed of a material having electrical conductivity and gas permeability, and as the material, there can, for example, be mentioned a porous material composed of carbon fiber such as carbon paper or carbon cloth. Such a material can be subjected to water repellent treatment for heightening water repellency.

By inserting a membrane electrode assembly obtained by a process as mentioned above between electrically conductive separator materials having both roles of separation of the electrode chamber and as a path for supplying gas to the electrode, a polymer electrolyte fuel cell can be obtained. The membrane electrode assembly of the invention can be used as a membrane electrode assembly for polymer electrolyte fuel cells such as a hydrogen-dedicated one using hydrogen as the fuel gas,
a methanol-reforming one using hydrogen obtained by reforming methanol, a natural gas-reforming one using hydrogen obtained by reforming natural gas, a gasoline-reforming one using hydrogen obtained by reforming gasoline and a direct methanol one wherein methanol is used directly.

A fuel cell using the polymer electrolyte membrane of the invention is excellent in chemical stability (radical resistance and/or oxidation stability) and has an advantage that lowering of power generation characteristic with time lapse is small, and thus can be used stably for a long time.

EXAMPLES

The present invention is further specifically described below through examples, comparative examples and referential examples, but the invention is not limited by these examples.

Referential Example 1

Production of a Block Copolymer Composed of Poly (α-methylstyrene) (Polymer Block (A)) and Hydrogenated Polybutadiene (Polymer Block (B)

In a similar process to a previously reported process (WO 02/40611), a poly (α-methylstyrene)-b-polybutadiene-poly (α-methylstyrene) triblock copolymer (hereinafter abbreviated as mSEBmS) was synthesized. The number average molecular weight (GPC measurement, in terms of polystyrene) of the resulting mSEBmS was 76,000, and the amount of the 1,4-bond determined by $^1$H-NMR measurement was 55% and the content of the α-methylstyrene unit also determined by the $^1$H-NMR measurement was 30.0% by mass. Further, it was revealed by composition analysis through $^1$H-NMR spectrum measurement that α-methylstyrene was not substantially copolymerized into the polybutadiene block.

A solution of the synthesized mSEBmS in cyclohexane was prepared, the solution was put in a pressure proof vessel whose atmosphere had sufficiently been replaced with nitrogen, and then, hydrogenation reaction was conducted at 80° C. for 5 hours in the atmosphere of hydrogen using an Ni/Al Ziegler hydrogenating catalyst to obtain a poly (α-methylstyrene) b-hydrogenated polybutadiene-poly (α-methylstyrene) triblock copolymer (hereinafter abbreviated as HmSEBmS). The hydrogenation proportion of the HmSEBmS was calculated by $^1$H-NMR spectrum measurement to be 99.6%.

Referential Example 2

Production of a Block Copolymer Composed of Poly (α-methylstyrene) (Polymer Block (A)) and Hydrogenated Polybutadiene (Polymer Block (B))(HmSEBmS)

An mSEBmS having a number average molecular weight of 51,300, a 1,4-bond amount of 59.2% and an α-methylstyrene unit content of 31.3% by mass was synthesized in a similar way as in Referential example 1. α-methylstyrene was not substantially copolymerized into the polybutadiene block. Similar operations as in Referential example 1 were made except to use this mSEBmS to obtain an HmSEBmS with a hydrogenation proportion of 99.4%.

Referential Example 3

Production of a Block Copolymer Composed of Poly (α-methylstyrene) (Polymer Block (A)) and Hydrogenated Polybutadiene (Polymer Block (B))(HmSEBmS)

An mSEBmS having a number average molecular weight of 74,700, a 1,4-bond amount of 39.5% and an α-methylstyrene unit content of 42.0% by mass was synthesized in a similar way as in Referential example 1. α-methylstyrene was not substantially copolymerized into the polybutadiene block. Similar operations as in Referential example 1 were made except that hydrogenation reaction was conducted at 50° C. for 7 hours, whereby an HmSEBmS with a hydrogenation proportion of 99.4% was obtained.

Referential Example 4

Production of a Block Copolymer Composed of Polystyrene (Polymer Block (A)) and Polyisobutylene (Polymer Block (B)

A polystyrene-b-polyisobutylene-b-polystyrene triblock copolymer (hereinafter abbreviated as SiBuS) was prepared according to a known process (WO 98/14518). The number average molecular weight (GPC measurement, in terms of polystyrene) of the resulting triblock copolymer was 69,000 and the styrene content thereof was 28.4%.

Example 1

(1) Synthesis of a Sulfonated HmSEBmS 100 g of the block copolymer obtained in Referential example 1 (HmSEBmS) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 2 hours to dissolve the block copolymer. After the dissolution, a sulfating reagent prepared by reacting 21.0 ml of acetic anhydride with 9.34 ml of sulfuric acid at 0° C. in 41.8 ml of methylene chloride was gradually added dropwise thereto over a period of 20 minutes. After stirring at 35° C. for 0.5 hour, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated HmSEBmS. The sulfonation proportion of the benzene rings of the α-methylstyrene units in the sulfonated HmSEBmS was 20.6% by mol from $^1$H-NMR analysis, and its ion exchange capacity was 0.48 meq/g.

(2) Production of an Electrolyte Membrane for Fuel Cells

A 5% by mass solution of the sulfonated HmSEBmS obtained in (1) in THF/MeOH (mass ratio 8/2) was prepared, and the solution was cast on a polytetrafluoroethylene sheet at a thickness of about 1,000 μm and sufficiently dried at room temperature to obtain a membrane of 50 μm thickness.

Example 2

(1) Synthesis of a Sulfonated HmSEBmS

Similar operations as in Example 1 were made except that the time of the sulfonation reaction was made to be 1 hour in Example 1 (1), whereby a sulfonated HmSEBmS was obtained. The sulfonation proportion of the benzene rings of the α-methylstyrene units in the sulfonated HmSEBmS was 30.1% by mol from $^1$H-NMR analysis, and its ion exchange capacity was 0.69 meq/g.

(2) Production of an Electrolyte Membrane for Fuel Cells

A membrane of 50 μm thickness was obtained in a similar manner as in Example 1(2) except to use the above sulfonated HmSEBmS.

(3) Production of a Single Cell for Polymer Electrolyte Fuel Cells

Electrodes for a polymer electrolyte fuel cell were produced according to the following procedure. A solution of 5% by mass Nafion in methanol was mixed with a carbon-supported Pt—Ru alloy catalyst so that the mass ratio between the Pt—Ru alloy and Nafion could be 2:1, whereby a paste of uniform dispersion was prepared. This paste was applied onto a transfer sheet and dried for 24 hours to prepare a catalyst layer for the anode side. A solution of 5% by mass Nafion in a mixed solvent of a lower alcohol and water was mixed with carbon carrying a Pt catalyst thereon so that the mass ratio between the Pt catalyst and Nafion could be 2:1, whereby a paste of uniform dispersion was prepared, and then, a catalyst layer for the cathode side was prepared in a similar way as in the anode side. The electrolyte membrane for fuel cells produced in (2) was put between the above two kinds of catalyst layers so that the membrane and the catalyst side of each catalyst layer faced each other, the resulting composite was put between two sheets of heat resistant film, the resulting composite was put between two stainless steel sheets, and the resulting composite was hot pressed (150° C., 100 kg/cm$^2$, 10 minutes) to stick the membrane and the catalyst layers together. Finally, the transfer sheets were peeled, and the sheets of heat resistant film and the stainless steel sheets were removed to produce a membrane electrode assembly. The membrane electrode assembly was put between two sheets of carbon paper, the resulting composite was put between two sheets of electrically conductive separators also having a role of paths for gas supply, the resulting composite was put between two sheets of electric current collectors, and the resulting composite was put between two clamping sheets to assemble a test cell for polymer electrolyte fuel cells.

Example 3

(2) Production of an Electrolyte Membrane for Fuel Cells

A solution of 18% by mass the sulfonated HmSEBmS obtained in Example 1 (1) in toluene/isobutyl alcohol (mass ratio 8/2) was prepared, and the solution was applied onto PET film after a mold releasing treatment (made by Toyobo Co., "Toyobo Ester Film K1504") at a thickness of about 550 μm and sufficiently dried at room temperature to obtain a membrane of 50 μm thickness.

Example 4

(2) Production of an Electrolyte Membrane for Fuel Cells

A solution of 18% by mass the sulfonated HmSEBmS obtained in Example 2 in cyclohexane/isopropyl alcohol (mass ratio 7/3) was prepared, and the solution was applied onto PET film after a mold releasing treatment (made by Toyobo Co., "Toyobo Ester Film K1504") at a thickness of about 550 μm and sufficiently dried at room temperature to obtain a membrane of 50 μm thickness.

Example 5

(1) Synthesis of a Sulfonated HmSEBmS

Similar operations as in Example 1 (1) were made except that the reaction time after the dropwise addition of the sulfating reagent was made to be 8 hours in Example 1 (1), whereby a sulfonated HmSEBmS was obtained. The sulfonation proportion of the benzene rings of the α-methylstyrene units in the sulfonated HmSEBmS was 51.0% by mol from $^1$H-NMR analysis, and its ion exchange capacity was 1.12 meq/g.

(2) Production of an Electrolyte Membrane for Fuel Cells

A solution of 14% by mass the sulfonated HmSEBmS obtained in (1) in toluene/isobutyl alcohol (mass ratio 8/2) was prepared, and the solution was applied onto PET film after a mold releasing treatment (made by Toyobo Co., "Toyobo Ester Film K1504") at a thickness of about 650 μm and sufficiently dried at room temperature to obtain a membrane of 50 μm thickness.

Example 6

(1) Synthesis of a Sulfonated HmSEBmS 90 g of the block copolymer obtained in Referential example 2 (HmSEBmS) was vacuum dried for 1 hour in a glass-made reaction vessel equipped with a stirrer, the inside atmosphere of the reaction vessel was replaced with nitrogen, 816 ml of methylene chloride was added, and the mixture was stirred at 35° C. for 2 hours to dissolve the block copolymer. After the dissolution, a sulfating reagent prepared by reacting 18.3 ml of acetic anhydride with 8.17 ml of sulfuric acid at 0° C. in 36.5 ml of methylene chloride was gradually added dropwise thereto over a period of 20 minutes. After stirring at 35° C. for 4 hours, the polymer solution was poured into 3 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated HmSEBmS. The sulfonation proportion of the benzene rings of the α-methylstyrene units in the sulfonated HmSEBmS was 30.8% by mol from $^1$H-NMR analysis, and its ion exchange capacity was 0.74 meq/g.

(2) Production of an Electrolyte Membrane for Fuel Cells

A solution of 22% by mass the sulfonated HmSEBmS obtained in (1) in toluene/isobutyl alcohol (mass ratio 8/2) was prepared, and the solution was applied onto PET film after a mold releasing treatment (made by Toyobo Co., "Toyobo Ester Film K1504") at a thickness of about 450 μm and sufficiently dried at room temperature to obtain a membrane of 50 μm thickness.

Example 7

(1) Synthesis of a Sulfonated HmSEBmS 106 g of the block copolymer obtained in Referential example 2 (HmSEBmS) was vacuum dried for 1 hour in a glass-made reaction vessel equipped with a stirrer, the inside atmosphere of the reaction vessel was replaced with nitrogen, 900 ml of methylene chloride was added, and the mixture was stirred at 35° C. for 2 hours to dissolve the block copolymer. After the dissolution, a sulfating reagent prepared by reacting 29.3 ml of acetic anhydride with 13.1 ml of sulfuric acid at 0° C. in 58.6 ml of methylene chloride was gradually added dropwise thereto over a period of 20 minutes. After stirring at 35° C. for 9 hours, the polymer solution was poured into 3 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated HmSEBmS. The sulfonation proportion of the benzene rings of the α-methylstyrene units in the sulfonated HmSEBmS was 52.7% by mol from $^1$H-NMR analysis, and its ion exchange capacity was 1.21 meq/g.

(2) Production of an Electrolyte Membrane for Fuel Cells

The sulfonated HmSEBmS obtained in (1) was treated in a similar way as in Example 6 (2) to obtain a membrane of 50 μm thickness.

Example 8

(1) Synthesis of a Sulfonated HmSEBmS 30 g of the block copolymer obtained in Referential example 3 (HmSEBmS) was vacuum dried for 1 hour in a glass-made reaction vessel equipped with a stirrer, the inside atmosphere of the reaction vessel was replaced with nitrogen, 381 ml of methylene chloride was added, and the mixture was stirred at 35° C. for 2 hours to dissolve the block copolymer. After the dissolution, a sulfating reagent prepared by reacting 6.55 ml of acetic anhydride with 2.93 ml of sulfuric acid at 0° C. in 13.1 ml of methylene chloride was gradually added dropwise thereto over a period of 20 minutes. After stirring at 35° C. for 4 hours, the polymer solution was poured into 1 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated HmSEBmS. The sulfonation proportion of the benzene rings of the α-methylstyrene units in the sulfonated HmSEBmS was 28.5% by mol from $^1$H-NMR analysis, and its ion exchange capacity was 0.95 meq/g.

(2) Production of an Electrolyte Membrane for Fuel Cells

The sulfonated HmSEBmS obtained in (1) was treated in a similar way as in Example 6 (2) to obtain a membrane of 50 μm thickness.

Comparative Example 1

(1) Synthesis of a Sulfonated SEBS

A sulfating reagent was prepared by reacting 17.1 ml of acetic anhydride with 7.64 ml of sulfuric acid at 0° C. in 34.2 ml of methylene chloride. Separately, 100 g of a SEBS (styrene-(ethylene-butylene)-styrene) block copolymer (made by KURARAY Co., Ltd., Septon 8007) was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 4 hours to dissolve the block copolymer. After the dissolution, the sulfating reagent was gradually added dropwise over a period of 20 minutes. After stirring at 35° C. for 5 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SEBS. The sulfonation proportion of the benzene rings of the styrene units in the sulfonated SEBS was 19.3% by mol from $^1$H-NMR analysis, and its ion exchange capacity was 0.51 meq/g.

(2) Production of a Membrane

A membrane of 50 µm thickness was obtained in a similar way as in Example 1 (2) except to use the above sulfonated SEBS.

Comparative Example 2

(1) Synthesis of a sulfonated SEBS

Similar operations as in Comparative example 1 (1) were made except that the time of the sulfonation reaction was made to be 12 hours in Comparative example 1 (1), whereby a sulfonated SEBS was obtained. The sulfonation proportion of the benzene rings of the styrene units in the sulfonated SEBS was 29.0% by mol from $^1$H-NMR analysis, and its ion exchange capacity was 0.75 meq/g.

(2) Production of an Electrolyte Membrane for Fuel Cells

A membrane of 50 µm thickness was obtained in a similar manner as in Example 1 (2) except to use the above sulfonated SEBS.

(3) Production of a Single Cell for Polymer Electrolyte Fuel Cells

A single cell was produced in a similar manner as in Example 2 (3) except to use the above membrane.

Comparative Example 3

(1) Synthesis of a Sulfonated SiBuS

A sulfating reagent was prepared by reacting 11.6 ml of acetic anhydride with 5.17 ml of sulfuric acid at 0° C. in 18.2 ml of methylene chloride. Separately, 100 g of the block copolymer (SiBuS) obtained in Referential example 4 was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 2 hours to dissolve the block copolymer. After the dissolution, the sulfating reagent was gradually added dropwise over a period of 20 minutes. After stirring at 35° C. for 2 hours, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated SiBuS. The sulfonation proportion of the benzene rings of the styrene units in the sulfonated SiBuS was 19.1% by mol from $^1$H-NMR analysis, and its ion exchange capacity was 0.50 meq/g.

(2) Production of a Membrane

A membrane of 80 µm thickness was obtained in a similar manner as in Example 1 (2) except to use the above sulfonated SiBuS.

Comparative Example 4

(1) Synthesis of a Sulfonated SiBuS

Similar operations as in Comparative example 3 (1) were made except that the reaction time of the sulfonation was made to be 10.5 hours in Comparative example 3 (1), whereby a sulfonated SiBuS was obtained. The sulfonation proportion of the benzene rings of the styrene units in the sulfonated SiBuS was 28.1% by mol from $^1$H-NMR analysis, and its ion exchange capacity was 0.72 meq/g.

(2) Production of an Electrolyte Membrane for Fuel Cells

A membrane of 50 µm thickness was obtained in a similar manner as in Example 1 (2) except to use the above sulfonated SiBuS.

(3) Production of a Single Cell for Polymer Electrolyte Fuel Cells

A single cell was produced in a similar manner as in Example 2 (3) except to use the above membrane.

Comparative Example 5

As a perfluorocarbonsulfonic acid polymer electrolyte, a Nafion film of DuPont Co. (Nafion 112) was chosen. The thickness of the film was about 50 µm, and its ion exchange capacity was 0.91 meq/g.

A single cell for polymer electrolyte fuel cells was produced in a similar manner as in Example 2 (3) except to use the above film in place of the electrolyte membrane for fuel cells.

Tests for Evaluation of Performance of the Polymer Membranes of Examples 1 to 8 and Comparative Examples 1 to 5 as a Proton-Conducting Electrolyte Membrane for Polymer Electrolyte Fuel Cells In the following tests of 1) to 4), the membrane produced from the sulfonated block copolymer obtained in each example or comparative example or the Nafion film was used as a sample.

1) Measurement of Ion Exchange Capacity

A sample was weighed (a (g)) in a glass vessel which can be shut tightly, an excess amount of an aqueous saturated solution of sodium chloride was added thereto, and the mixture was stirred overnight. Hydrogen chloride formed in the system was titrated (b (ml)) with a 0.01 N aqueous NaOH standard solution (titer f) using a phenolphthalein solution as an indicator. The ion exchange capacity of the sample was calculated according to the following equation.

$$\text{Ion exchange capacity} = (0.01 \times b \times f)/a$$

2) Measurement of Proton Conductivity

A sample of 1 cm×4 cm was put between a pair of platinum electrodes, and the composite was set in an open-air cell. The resulting open-air cell was placed in a constant temperature and constant humidity chamber whose inside temperature and relative humidity were adjusted to 60° C. and 90%, respectively, and the proton conductivity was measured by the alternating current impedance method.

3) Measurement of Membrane Strength

A sample was molded into a dumbbell shape and its breaking strength was measured under a condition of a pulling rate of 500 mm/min.

4) Radical Stability Test

D-glucose and iron (II) chloride tetrahydrate were dissolved in an aqueous 3% by mass hydrogen peroxide solution to prepare a radical reaction reagent. After confirming that the temperature of the radical reaction reagent became constant at 60° C., a sample was added, and reaction was allowed to progress for 4 hour and 8 hours. Then, the sample was sufficiently washed with distilled water.

5) Evaluation of the Power Generation Characteristic of a Single Cell for Fuel Cells As to the single cell for polymer electrolyte fuel cells produced in each of Example 2 and Comparative examples 2, 4 and 5, power generation characteristic was evaluated. A 1 M MeOH aqueous solution was used as a fuel, and air was used as an oxidizing agent. The test was conducted at a cell temperature of 80° C. under a condition of MeOH: 5 cc/min and air: 500 cc/min.

Results of the Performance Tests as a Proton-Conducting Polymer Electrolyte Membrane The results of measurement of the proton conductivity of the membranes produced in Examples 1 to 8 and Comparative examples 2, 4 and 5 are shown in Table 1. From comparison of Example 1 and Example 2 and comparison of Examples 3 to 5 in Table 1, it was revealed that proton conductivity increases in proportion to the increase of sulfonation proportion. Further, from comparison of Example 2, Comparative example 2 and Comparative example 4, it was revealed that the same extent of proton conductivity is displayed in spite of difference in polymer skeletons.

The results of the membrane strength of the membranes produced in Examples 1 to 8 and Comparative examples 2, 4 and 6 are shown in Table 1. The membranes having relatively lower sulfonation proportions produced in Examples 1, 2, 3, 4 and 6 exhibited higher membrane strength values than Nafion 112. On the other hand, in membranes in which the amount of the ion-conducting group was made larger, as seen in Example 5 compared with Examples 3 and 4 and in Example 7 compared with Example 6, a tendency that the membrane strength decreases were shown. The reason is considered to be that water molecules adsorbed on the ion-conducting groups exhibit a plasticizing action.

It was revealed from comparison of Example 2, Comparative example 2 and Comparative example 4 in polymer skeletons (the amounts of ion-conducting groups are almost the same) that the sulfonated HmSEBmS has the largest membrane strength.

The radical stability test was conducted on the membranes produced in Examples 1 and 2 and Comparative examples 1 to 5. The results of measurement of the mass retention proportion and the ion exchange capacity retention proportion after 4 hours and 8 hours reaction are shown in Table 2.

In the membranes produced in Comparative examples 1 and 2 in Table 2, after the 4 hours test, the length of each side expanded about 1.3-fold, and white turbidity and wrinkles were intense. In the membranes after the 8 hours test, the length of each side expanded 1.5-fold or more, and white turbidity and striking wrinkles were observed. The membranes produced in Comparative examples 3 and 4 held its shape after the 4 hours test, but wrinkles were intense and white turbidity was observed partly. After the 8 hours reaction, the membrane produced in Comparative example 3 held its shape but wrinkles and white turbidity were intense all over the membrane, and the membrane produced in Comparative example 4 could not hold its shape and dispersed into the reaction solution as fine powder.

In the membranes produced in Comparative examples 1, 2 and 3, their mass retention proportions considerably decreased after the 8 hours test, and their ion exchange capacities sharply decreased after the 4 hours test and still further decreased after the 8 hours test.

On the other hand, in the membranes produced in Examples 1 and 2, even after the 8 hours test, any change was not observed on the outside appearance of the membranes, and these membranes held mass of 98% or more and an ion exchange capacity of 92% or more and exhibited excellent radical stability.

From the results of Table 2, it was revealed that the electrolyte membranes for fuel cells composed of an α-methyl-styrene-type block copolymer have remarkably higher ion exchange capacity retention proportions in the radical stability test than those of the sulfonated SEBSs and the sulfonated SiBuSs, and thus have radical resistance at the part of the ion channel.

On the other hand, in Nafion 112 of Comparative example 5, any change was not observed on the outside appearance of the membrane as is the case of the sulfonated HmSEBmSs,

TABLE 1

|  | Structure of block copolymer | Sulfonation proportion (% by mol) | Ion exchange capacity (meq/g) | Proton conductivity (S/cm) | Membrane strength (MPa) |
| --- | --- | --- | --- | --- | --- |
| Example 1 | Sulfonated HmSEBmS | 20.6 | 0.48 | 0.0200 | 23.0 |
| Example 2 | Sulfonated HmSEBmS | 30.1 | 0.69 | 0.0600 | 22.4 |
| Example 3 | Sulfonated HmSEBmS | 20.6 | 0.48 | 0.0120 | 30.1 |
| Example 4 | Sulfonated HmSEBmS | 30.1 | 0.69 | 0.0400 | 28.7 |
| Example 5 | Sulfonated HmSEBmS | 51.0 | 1.12 | 0.1060 | 24.0 |
| Example 6 | Sulfonated HmSEBmS | 30.8 | 0.74 | 0.0590 | 26.0 |
| Example 7 | Sulfonated HmSEBmS | 52.7 | 1.21 | 0.1350 | 22.0 |
| Example 8 | Sulfonated HmSEBmS | 28.5 | 0.95 | 0.0630 | 18.3 |
| Comparative example 2 | Sulfonated SEBS | 29.0 | 0.75 | 0.0600 | 12.8 |
| Comparative example 4 | Sulfonated SiBuS | 28.1 | 0.72 | 0.0500 | 8.1 |
| Comparative example 5 | Nafion 112 | — | 0.91 | 0.1200 | 19.8 | but its ion exchange capacity changed with time lapse, and after the 8 hours reaction, was lowered even to 79.0%. Since there was almost no mass change, it is surmised that the deterioration is not due to decomposition reaction of the principal chain, but due to elimination of the sulfonic acid groups.

650 ml of chloroform was added, and the mixture was stirred at 35° C. for 2 hours to dissolve the block copolymer. After the dissolution, 135 ml of chloromethyl ethyl ether and 5.7 ml of tin tetrachloride were added, and the mixture was stirred at 35° C. for 9 hours. Then, the resulting reaction solution was added to 4 L of methanol, and the resulting precipitate was

TABLE 2

|  | Structure of block copolymer | After 4 hours test | | After 8 hours test | |
| --- | --- | --- | --- | --- | --- |
|  |  | Mass retention proportion (%) | Ion exchange capacity retention proportion (%) | Mass retention proportion (%) | Ion exchange capacity retention proportion (%) |
| Example 1 | Sulfonated HmSEBmS | 99.8 | 96.8 | 99.8 | 93.5 |
| Example 2 | Sulfonated HmSEBmS | 99.7 | 92.8 | 98.8 | 92.3 |
| Comparative example 1 | Sulfonated SEBS | 95.6 | 71.0 | 83.7 | 38.7 |
| Comparative example 2 | Sulfonated SEBS | 91.7 | 70.1 | 80.6 | 37.6 |
| Comparative example 3 | Sulfonated SiBuS | 97.4 | 69.7 | 92.6 | 45.5 |
| Comparative example 4 | Sulfonated SiBuS | 80.9 | 67.1 | Membrane was dispersed into the reaction solution | |
| Comparative example 5 | Nafion 112 | 99.0 | 86.7 | 98.4 | 79.0 |

As a power generation characteristic of the single cells for polymer electrolyte fuel cells obtained in Example 2 and Comparative examples 2, 4 and 5, change of voltage as against current density was measured. The results are shown in FIGS. 1 to 4. The open circuit voltage of the single cell produced in Example 2 was 0.62 V and the maximum power density thereof was 58.2 mW/cm$^2$, these values are the same level as the open circuit voltage of 0.61 V and the maximum power density of 57.0 mW/cm$^2$ of Nafion 112 in Comparative example 5, and thus the single cell of Example 2 can sufficiently be used as a single cell for fuel cells. On the other hand, as to the single cells produced in Comparative examples 2 and 4, their open circuit voltages were as low as 0.34 V and 0.37 V, respectively and the maximum power densities thereof were also as low as 15.0 mW/cm$^2$ and 21.1 mW/cm$^2$, respectively. As to this, it is considered that, in the membranes obtained in Comparative example 2 (2) and Comparative example 4 (2), because of their low membrane strengths, a possibility is high that defects such as pinholes arose to the membranes by the hot pressing in the production of the membrane electrode assemblies, and it is considered that only low performance was obtained due to these defects.

From the results of the power generation characteristic of the single cells for fuel cells, it was made clear that the single cell for polymer electrolyte fuel cells produced in Example 2 (3) of the invention displays a high power generation characteristic.

Example 9

(1) Production of a Membrane of a Quaternary Ammonium Hydroxide Groups-Modified HmSEBmS 100 g of the block copolymer obtained in Referential example 1 (HmSEBmS) was vacuum dried for 1 hour in a glass-made reaction vessel equipped with a stirrer, the inside atmosphere of the reaction vessel was replaced with nitrogen, washed and dried to obtain chloromethylated HmSEBmS. The chloromethylation proportion of the chloromethylated HmSEBmS was 60.9% by mol of the α-methylstyrene units from $^1$H-NMR analysis.

Then, the chloromethylated HmSEBmS was dissolved in toluene, and the solution was cast on a polytetrafluoroethylene sheet and sufficiently dried at room temperature to obtain a cast membrane of 70 μm thickness.

The obtained cast membrane was immersed in a mixed solution of an aqueous 30% trimethylamine solution and acetone at a volume ratio of 1:1 at room temperature for 24 hours to aminate the chloromethyl groups (formation of —CH$_2$N$^+$ (CH$_3$)$_3$Cl$^-$ groups). Finally, the aminated HmSEBmS membrane was immersed in an aqueous 0.5 N—NaOH solution at room temperature for 5 hours to conduct ion exchange to obtain a membrane of a quaternary ammonium hydroxide groups-modified HmSEBmS. The thickness of the membrane was 100 μm and the ion exchange capacity thereof was calculated based on the value obtained from $^1$H-NMR measurement to 1.30 meq/g.

(2) Production of a Single Cell for Polymer Electrolyte Fuel Cells

Electrodes for a polymer electrolyte fuel cell were produced according to the following procedure. A chloroform/isobutyl alcohol solution of the quaternary ammonium hydroxide groups-modified HmSEBmS obtained in (1) (chloroform:isobutyl alcohol=7:3, 4% by mass) was mixed with a carbon-supported Pt catalyst to prepare a paste of uniform dispersion. This paste was uniformly applied on one side of carbon paper subjected to a water repellent treatment, and the resulting coated carbon paper was allowed to stand for several hours to produce a carbon paper electrode. The amount of Pt loaded and the content of the quaternary ammonium hydroxide groups-modified HmSEBmS were 1.0 mg/cm$^2$, respectively. Then, the membrane (10 cm×10 cm) prepared in (1) was put between two sheets of the carbon paper electrodes (5 cm×5 cm) as prepared above so that the membrane and the catalyst side of each electrode faced each other, the resulting composite was put between two sheets of heat resistant film, the resulting composite was put between two stainless steel sheets, and the resulting composite was hot pressed (60° C., 80 kg/cm², 2 minutes) to make a membrane electrode assembly.

The membrane electrode assembly made above (wherein the sheets of heat resistant film and the stainless steel sheets were removed) was put between two sheets of electrically conductive separators also having a role of paths for gas supply, the resulting composite was put between two sheets of electric current collectors, and the resulting composite was put between two clamping plates to assemble a test cell for polymer electrolyte fuel cells. In this connection, a gasket was placed between the membrane electrode assembly and each separator for preventing gas leak from a difference in level corresponding to the thickness of the electrode.

Comparative Example 6

Preparation of a Membrane of a Quaternary Ammonium Hydroxide Groups-Modified SEBS 100 g of SEBS (styrene-(ethylene-butylene)-styrene) block copolymer (made by KURARAY Co., Ltd., "Septon 8007") was vacuum dried for 1 hour in a glass-made reaction vessel equipped with a stirrer, the inside atmosphere of the reaction vessel was replaced with nitrogen, 750 ml of chloroform was added, and the mixture was stirred at 35° C. for 2 hours to dissolve the block copolymer. After the dissolution, 160 ml of chloromethyl ethyl ether and 6.74 ml of tin chloride were added, and the mixture was stirred at 35° C. for 8 hours. Then, the resulting reaction solution was added to 4 L of methanol, and the resulting precipitate was washed and dried to obtain chloromethylated SEBS. The chloromethylation proportion of the chloromethylated SEBS was 60.1% by mol of the styrene units from $^1$H-NMR analysis.

Then, in a similar way as in Example 9 (1), a cast membrane was produced, and aminated and subjected to ion exchange to obtain a membrane of a quaternary ammonium hydroxide groups-modified SEBS. The thickness of the membrane was 100 µm and the ion exchange capacity thereof was calculated based on the value obtained from $^1$H-NMR measurement to 1.41 meq/g.

Tests for Evaluation of Performance of the Anion Exchange-Type Electrolyte Membranes Produced in Example 9 (1) and Comparative Example 6 as an Electrolyte Membrane for Polymer Electrolyte Fuel Cells In the following tests of 1) and 2), the quaternary ammonium hydroxide groups-modified block copolymer membrane produced in each of Example 9 (1) and Comparative example 6 was used as a sample.

1) Measurement of Hydroxide Ion Conductivity

A sample of 1 cm×4 cm was put between a pair of platinum black-plated platinum electrodes, and the composite was set in an open-air cell. The resulting open cell was placed in a constant temperature and constant humidity chamber whose inside temperature and relative humidity were adjusted to 60° C. and 90%, respectively, and the hydroxide ion conductivity of the sample was measured according to the alternating current impedance method.

2) Oxidation Stability Test

A sample was added into an aqueous 3% by mass hydrogen peroxide solution whose temperature was maintained at 60° C., and reaction was allowed to progress for 2 hours and 8 hours. Then, the sample was immersed in 0.5 N—NaOH for 1 hour, and then sufficiently washed with distilled water.

3) Evaluation of the Power Generation Characteristic of a Single Cell for Fuel Cells As to the single cell for polymer electrolyte fuel cells produced in Example 9 (2), fuel cell power generation characteristic was evaluated. Humidified hydrogen was used as a fuel, and humidified oxygen was used as an oxidizing agent. The test was conducted at a cell temperature of 80° C. under a condition of hydrogen: 500 ml/min and oxygen: 500 ml/min.

Results of the Performance Tests as an Anion Exchange-Type Electrolyte Membrane

The results of the ion conductivity measurement test and the oxidation stability test conducted on the membranes produced in Example 9 (1) and Comparative example 6 are shown in Table 3.

It was made clear from the results of Table 3 that the quaternary ammonium-type anion exchange electrolyte membrane of the invention composed of the α-methylstyrene-type block copolymer exhibits a remarkably higher mass retention proportion in the oxidation stability test than that of the quaternary ammonium-type anion exchange electrolyte membrane composed of the SEBS.

TABLE 3

|  | Ion conductivity before the test (S/cm) | After 2 hours test | | After 8 hours test | |
| --- | --- | --- | --- | --- | --- |
|  |  | Mass retention proportion (%) | Ion conductivity (S/cm) | Mass retention proportion (%) | Ion conductivity (S/cm) |
| Example 9(1) | $1.69 \times 10^{-2}$ | 100 | $1.68 \times 10^{-2}$ | 97 | $1.67 \times 10^{-2}$ |
| Comparative example 6 | $1.71 \times 10^{-2}$ | 93 | $1.60 \times 10^{-2}$ | 81 | $1.01 \times 10^{-2}$ |

Figure 5:
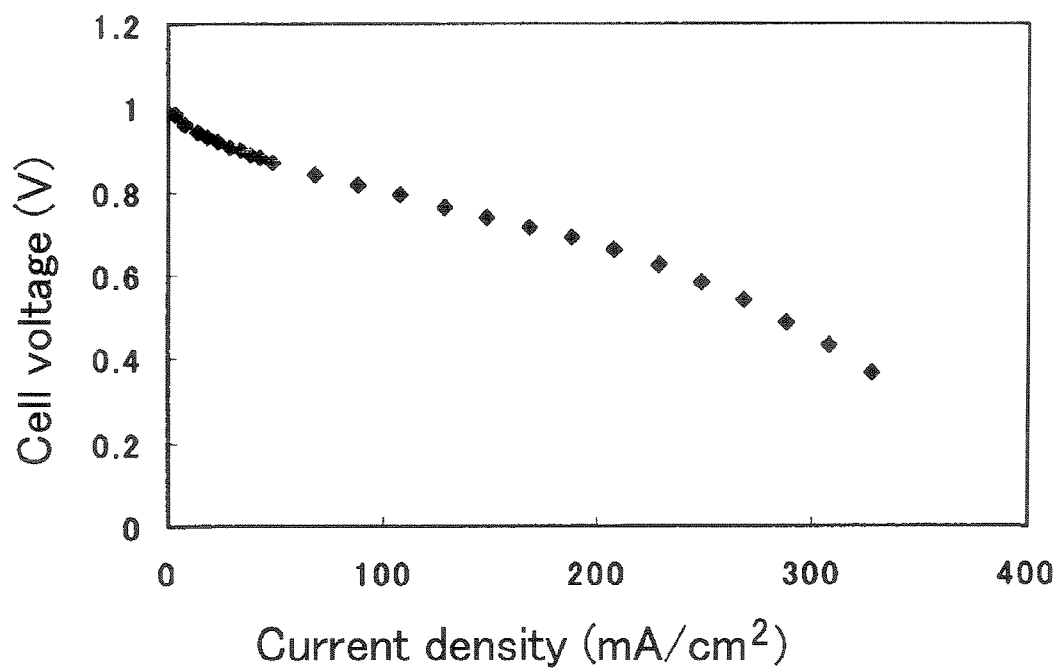
FIG. 5 is a drawing showing the current density-output voltage of a single cell for anion exchange-type polymer electrolyte fuel cells (Example 9 (2)).

As a power generation characteristic of the single cell for polymer electrolyte fuel cells produced in Example 9 (2), change of voltage as against current density was measured. The result is shown in FIG. 5.

The open circuit voltages of the single cell was about 1.0 V and the maximum power density thereof was 147 mW/cm², and it was made clear that the quaternary ammonium hydroxide groups-modified HmSEBmS membrane produced in Example 9 (1) can be used as an electrolyte membrane for polymer electrolyte fuel cells.

INDUSTRIAL APPLICABILITY

The polymer electrolyte membrane of this invention is economical, mild to the environment, excellent in moldability and oxidation stability and thus durability, and, further, sufficiently displays its functions even under a condition of high temperatures, and, thus, can suitably be used in membrane electrode assemblies and polymer electrolyte fuel cells.

The invention claimed is:

1. A polymer electrolyte membrane for polymer electrolyte fuel cells, comprising a block copolymer which comprises
   a polymer block (A) having an aromatic vinyl compound unit whose α-carbon is a quaternary carbon, and
   a flexible polymer block (B),
   wherein said block copolymer has ion-conducting groups on the polymer block (A), and
   wherein the percentage of the aromatic vinyl compound unit whose α-carbon is a quaternary carbon in the polymer block (A) is 50% by mass or more of the polymer block (A).

2. The electrolyte membrane according to claim 1, wherein the ion-conducting groups are monovalent cation-conducting groups or anion-conducting groups, and when the ion-conducting groups are anion-conduction groups, the polymer block (A) has monovalent anion-conducting groups, or polyvalent anion-conducting groups which are bonded so as to crosslink the polymer blocks (A) and/or so as to crosslink the aromatic vinyl compound units inside the polymer block (A).

3. The electrolyte membrane according to claim 1, wherein the mass ratio of the polymer block (A) to the polymer block (B) is 95:5 to 5:95.

4. The electrolyte membrane according to claim 1, wherein the aromatic vinyl compound unit whose α-carbon is quaternary carbon is an aromatic vinyl compound unit wherein the hydrogen atom bonded to the α-carbon is replaced with an alkyl group having 1 to 4 carbon atoms, a halogenated alkyl group having 1 to 4 carbon atoms or a phenyl group.

5. The electrolyte membrane according to claim 1, wherein the polymer block (B) is a polymer block comprising at least one unit selected from the group consisting of an alkene unit having 2 to 8 carbon atoms, a cycloalkene unit having 5 to 8 carbon atoms, a vinylcycloalkene unit having 7 to 10 carbon atoms, a conjugated diene unit having 4 to 8 carbon atoms and a conjugated cycloalkadiene unit having 5 to 8 carbon atoms; and a vinylcycloalkene unit having 7 to 10 carbon atoms, a conjugated diene unit having 4 to 8 carbon atoms and a conjugated cycloalkadiene unit having 5 to 8 carbon atoms in which units, part or all of carbon-carbon double bonds are hydrogenated.

6. The electrolyte membrane according to claim 5, wherein the polymer block (B) is a polymer block comprising at least one unit selected from the group consisting of an alkene unit having 2 to 8 carbon atoms, a conjugated diene unit having 4 to 8 carbon atoms, and a conjugated diene unit having 4 to 8 carbon atoms wherein part or all of carbon-carbon double bonds are hydrogenated.

7. The electrolyte membrane according to claim 1, wherein the aromatic vinyl compound unit whose α-carbon is quaternary carbon is an α-methylstyrene unit, and the polymer block (B) is a polymer block comprising at least one unit selected from the group consisting of a conjugated diene unit having 4 to 8 carbon atoms and a conjugated diene unit having 4 to 8 carbon atoms wherein part or all of carbon-carbon double bonds are hydrogenated.

8. The electrolyte membrane according to claim 1, wherein the ion-conducting group is a cation-conducting group, and the cation-conducting group is a group represented by $-SO_3M$ or $-PO_3HM$ wherein M represents a hydrogen atom, an ammonium ion or an alkali metal ion.

9. The electrolyte membrane according to claim 8, wherein in the radical stability test at 60° C. which is conducted by adding the block copolymer to a radical reaction reagent obtained by dissolving D-glucose and iron (II) chloride tetrahydrate in an aqueous 3% by mass hydrogen peroxide solution, the ion exchange capacity retention proportion of the block copolymer after 8 hours is 50% or more.

10. The electrolyte membrane according to claim 1, wherein the ion-conducting group is an anion-conducting group, and the anion-conducting group is at least one selected from the following groups of (1) to (13)

(1)

(2)

(3)

(4)

(5)

(6)

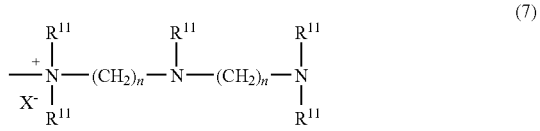
(7)

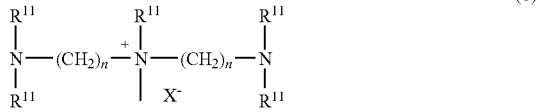
(8)

(9)

(10)

-continued

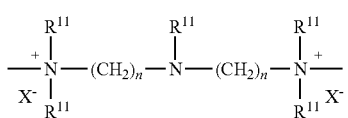 (11)

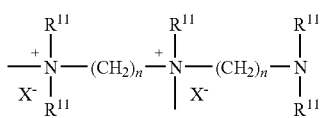 (12)

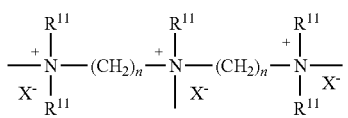 (13)

wherein $R^1$ to $R^3$ represent respectively independently hydrogen atoms or alkyl groups having 1 to 8 carbon atoms, $R^4$ to $R^9$ and $R^{11}$ represent respectively independently hydrogen atoms, methyl groups or ethyl groups, $R^{10}$ represents a methyl group or an ethyl group, $X^-$ represents a hydroxide ion or an acid anion, m represents an integer of 2 to 6, and n represents 2 or 3.

11. The electrolyte membrane according to claim 10, wherein $R_1$ to $R^9$ and $R^{11}$ are methyl groups or ethyl groups, and $X^-$ is a hydroxide ion.

12. The electrolyte membrane according to claim 11, wherein $R^1$ to $R^{11}$ are methyl groups.

13. The electrolyte membrane according to claim 10, wherein in the oxidation stability test at 60° C. which is carried out by adding the block copolymer to an aqueous 3% by mass hydrogen peroxide solution, the mass retention proportion of the block copolymer after 8 hours is 85% or more.

14. The electrolyte membrane according to claim 1, wherein the ion exchange capacity of the block copolymer is 0.30 meq/g or more.

15. A membrane electrode assembly comprising the electrolyte membrane according to claim 1.

16. A polymer electrolyte fuel cell comprising the membrane electrode assembly according to claim 15.

* * * * *